US012807830B2

(12) United States Patent
De Wolf et al.

(10) Patent No.: US 12,807,830 B2
(45) Date of Patent: Nov. 24, 2026

(54) PROCESS FOR OVERSPRAY-FREE APPLICATION OF A RESIN COMPOSITION AND RESIN COMPOSITIONS FOR USE IN THE PROCESS

(71) Applicant: ALLNEX NETHERLANDS B.V., Bergen Op Zoom (NL)

(72) Inventors: Elwin Aloysius Cornelius Adrianus De Wolf, Hoogerheide (NL); Martin Bosma, Arnhem (NL)

(73) Assignee: ALLNEX NETHERLANDS B.V., Bergen op Zoom (NL)

( * ) Notice: Subject to any disclaimer, the term of this patent is extended or adjusted under 35 U.S.C. 154(b) by 417 days.

(21) Appl. No.: 18/287,102

(22) PCT Filed: Apr. 26, 2022

(86) PCT No.: PCT/EP2022/061088
§ 371 (c)(1),
(2) Date: Oct. 16, 2023

(87) PCT Pub. No.: WO2022/229209
PCT Pub. Date: Nov. 3, 2022

(65) Prior Publication Data
US 2024/0199901 A1 Jun. 20, 2024

(30) Foreign Application Priority Data
Apr. 28, 2021 (EP) .................................... 21170968

(51) Int. Cl.
*C09D 11/36* (2014.01)
*B41M 5/00* (2006.01)
(Continued)

(52) U.S. Cl.
CPC ........... *C09D 11/36* (2013.01); *B41M 5/0047* (2013.01); *B41M 5/0088* (2013.01); *C09D 5/04* (2013.01); *C09D 7/43* (2018.01); *C09D 7/80* (2018.01)

(58) Field of Classification Search
CPC ........ C09D 11/36; C09D 7/43; B41M 5/0047; B41M 5/0088
See application file for complete search history.

(56) References Cited

U.S. PATENT DOCUMENTS 8,207,268 B2 6/2012 Brinkhuis
2013/0284833 A1* 10/2013 Fritz .................... B05B 7/0815 239/102.1
(Continued)

FOREIGN PATENT DOCUMENTS

CN 101103061 1/2008
EP 0 192 304 8/1986
(Continued)

OTHER PUBLICATIONS

International Search Report (ISR) issued Jun. 22, 2022 in International (PCT) Application No. PCT/EP2022/061088.

*Primary Examiner* — Nathan T Leong
(74) *Attorney, Agent, or Firm* — Wenderoth, Lind & Ponack, L.L.P.

(57) ABSTRACT

The invention relates to a process for overspray-free application of a non-aqueous thixotropic resin composition on a substrate surface and to non-aqueous thixotropic resin compositions for use in the process comprising a resin and a thixotropy agent comprising polyurea particles characterised in that the resin composition has a high-shear viscosity HSV measured at a shear rate of 1000±50 $s^{-1}$ that is lower than
(Continued)

100 mPa·s and a creep compliance Jmax measured after 300 seconds using a creep stress of 1.0 Pa of lower than 250 $Pa^{-1}$.

5 Claims, 1 Drawing Sheet

(51) Int. Cl.

| | |
|---|---|
| ***C09D 5/04*** | (2006.01) |
| ***C09D 7/43*** | (2018.01) |
| *C09D 7/80* | (2018.01) |

(56) References Cited

U.S. PATENT DOCUMENTS

| | | | | |
|---|---|---|---|---|
| 2015/0086723 | A1 | 3/2015 | Büstgens | |
| 2015/0375258 | A1 | 12/2015 | Fritz et al. | |
| 2017/0182516 | A1 | 6/2017 | Fritz et al. | |
| 2020/0048398 | A1 * | 2/2020 | Bosma | C09D 5/04 |
| 2020/0148892 | A1 | 5/2020 | Haveman et al. | |

FOREIGN PATENT DOCUMENTS

| | | |
|---|---|---|
| EP | 0 198 519 | 10/1986 |
| EP | 1 884 365 | 2/2008 |
| EP | 1 902 081 | 12/2010 |
| EP | 3 381 961 | 10/2018 |
| JP | 2020-022965 | 2/2020 |
| WO | 2006/074895 | 7/2006 |
| WO | 2011/138048 | 11/2011 |
| WO | 2014/121926 | 8/2014 |
| WO | 2018/083328 | 5/2018 |
| WO | 2020/094636 | 5/2020 |
| WO | 2020/187928 | 9/2020 |
| WO | 2021/122978 | 6/2021 |

* cited by examiner

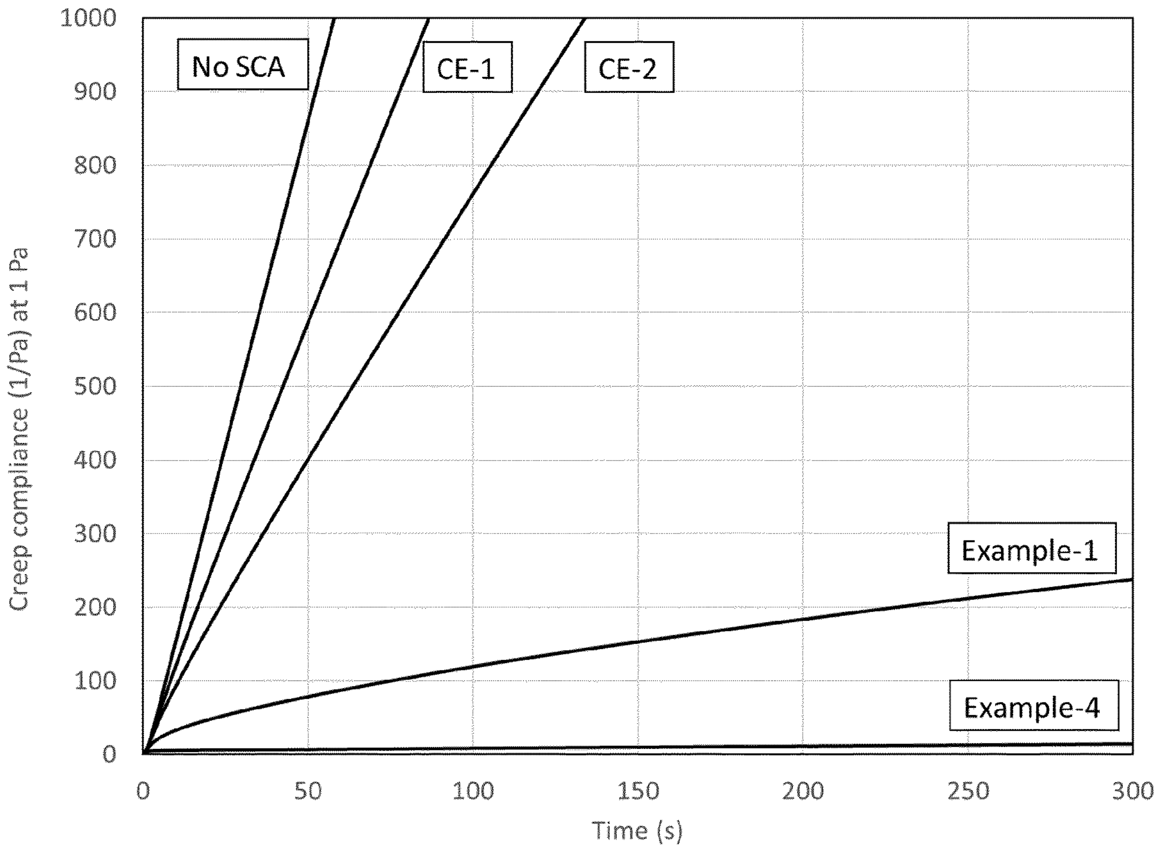
1000
900
800
700
600
500
400
300
200
100
0
Creep compliance (1/Pa) at 1 Pa
0
50
100
150
200
250
300
Time (s)
No SCA
CE-1
CE-2
Example-1
Example-4

PROCESS FOR OVERSPRAY-FREE APPLICATION OF A RESIN COMPOSITION AND RESIN COMPOSITIONS FOR USE IN THE PROCESS

BACKGROUND OF THE INVENTION

1. Field of the Invention

The invention relates to a process for overspray-free application of a resin composition and to resin compositions for use in the process.

2. Description of the Related Art

Application of liquid paints on large objects such as motor vehicle body components, airplanes, trains, or garage doors is often done via electrostatic spraying using rotary atomizers, which atomize the paint to be applied using a rotating bell cup. Compared to pneumatic spraying, electrostatic spraying offers the advantage of improving the transfer efficiency by reducing the amount of overspray via charging of the paint droplets. Here overspray is used to denote sprayed paint that does not reach the target location but for instance deposits on unintended locations or is carried away with surrounding air streams. Even with electrostatic spraying the amount of overspray can still be as high as 20-30%.

Overspray is also highly undesired in case of e.g. multi-tone cars, application of stripes or logo's or any other case where paint needs to be applied only on well-defined locations. With spray application techniques, parts that are not intended to be coated need to be masked for this purpose. Masking is a time-consuming, labor intensive and costly process and results in considerable waste streams.

The aforementioned disadvantages of spray application of liquid paints can be strongly reduced or even eliminated by using overspray-free application techniques. In this technique the paint is deposited on the target locations using a print head applicator device providing drop-on-demand or jet stream-on-demand. Jet streams in this context refers to predominantly continuous streams of paint in contrast to streams formed from individual droplets. The print head applicator device typically comprises a perforated plate comprising a plurality of small holes through which the liquid resin composition is pressed. The print head can be located close to the target location to be coated which ensures that the paint impinges the object only at the target location thereby practically eliminating overspray. Examples of overspray free applications are described for instance in WO2011138048, WO2014121926, EP1884365, US2015/0086723 and US2017182516.

WO2011138048/US2013284833 describes a coating device, comprising at least one application apparatus to discharge a coating agent from at least one coating agent nozzle configured to discharge at least one coherent coating agent jet to break up into droplets between the coating agent nozzle and the component by applying oscillation.

WO2014121926 describes a specific nozzle plate for application of a composition. Nozzle openings are smaller than 0.2 mm.

EP1884365 describes an applicator head for applying paint to an object surface, said applicator head comprising at least one fluid supply channel and at least one nozzle outlet for paint arranged with actuation means for producing a pressure pulse in the paint so arranged capable of causing a small quantity of paint to be ejected.

US2015/0086723 describes a device and method of applying a homogeneous layer of a coating material on a surface with a manually operated application device comprising a number of drop-on-demand printing nozzles.

US2017182516 describes a painting method for painting a component like a car-body with a decorative coating by an overspray free applicator which applies a coating agent sharp-edged and overspray-free.

The prior art documents only relate to methods and devices for the overspray-free coating or printing using perforated plates or plates with nozzles but do not describe the resin composition nor the requirements or specific problems arising from the resin compositions used in the overspray free application process.

One of the challenges with applying resin compositions in overspray-free lack application (OFA) using printing heads with a perforated plate is the high pressure drop over the printing head plate. This pressure-drop increases with the thickness of the plate, the flow rate of the resin composition through the hole and with the viscosity of the composition and increases very significantly with decreasing diameter of the holes. In practice a minimum thickness of the plate is required to ensure sufficient mechanical strength, small holes are required to ensure the required droplet or jet stream formation and high flow rates are needed to reduce the resin composition application time and for proper droplet or jet stream formation performance. If the viscosity of non-aqueous resin compositions is too high the pressure-drop is too high with the risk of irregular instable jet- or droplet streams.

In overspray-free application, the distance between the print head and the substrate surface to be covered is, as opposed to spray applications, typically less than 15 cm, preferably less than 10, more preferably less than 6 or even less than 5 cm and typically more than about 0.1, preferably more than 0.5, more preferably more than 1 cm and even more preferably more than 2 cm, whereas in spray painting the distance is typically more than 15 cm, typically in the range of about 15-25 cm. The time for the paint from leaving the print head to arriving at the substrate surface to be painted is, as opposed to spray applications, very short; typically less than 50 milliseconds (ms), preferably less than 25 ms, more preferably less than 15 ms or even less than 10 ms, which results in the important difference that in overspray-free application practically no solvent evaporation can take place before the composition arrives on the substrate surface. Therefore, the composition and the viscosity of the resin composition arriving on the substrate is substantially the same as the resin composition leaving the print head. Therefore, a Newtonian resin composition would have, as a result of the low viscosity of the resin composition required for overspray-free application, also have a low viscosity when applied to the substrate surface resulting in unacceptably high sagging on non-horizontal oriented surfaces and even on practically horizontal surface parts like the roof of cars. The high sagging tendency also results in poor edge coverage for instance at holes in the object or at sharp edges. Therefore, there are conflicting requirements in overspray-free application of low viscosity on one hand to be able to eject jet streams or droplet streams of the resin composition through the very small openings of the printing head and on the other hand the requirement of low sagging tendency of the resin composition when applied on the substrate surface.

It is assumed that this problem is easier to overcome in overspray-free application of aqueous dispersions of resins because aqueous resin dispersions can show strong pseudoplasticity due to their dispersive colloidal behavior causing a substantial and almost instantaneous difference between the viscosity under high-shear conditions and the viscosity under low-shear conditions. However, the above described conflict of requirements is difficult to overcome in non-aqueous resin compositions, such as solvent borne compositions comprising a resin dissolved in an organic solvent or curable compositions, for example UV curing compositions, that comprise low molecular weight crosslinkable components and substantially no organic solvent. There is a desire in the technical field of overspray-free application to be able to also use non-aqueous resin compositions which broadens the range of applications of overspray-free application and overcomes certain disadvantages of aqueous resin dispersions such as the slow evaporation rate and long drying time, the mechanical properties, chemical resistance and optical quality of the resulting layer etc.

Another problem with overspray-free application of paint films is the visibility of jet stream patterns on the surface of the cured film. The jet streams exiting the print head have to spread over a significantly wider area perpendicular to the direction of the printing head compared to their diameter. In order to form a continuous and smooth paint layer the deposited layers from neighboring jet streams have to merge and the jet stream pattern has to level out. A similar problem occurs in the (overlap) area where a second deposited paint layer needs to merge and level with the neighboring first deposited paint layer. Paints with a very low sagging tendency normally show a poor capability to flow evenly over the substrate. Therefore surface unevenness introduced by the application step, as well as unevenness from the underlying substrate cannot be leveled out as much as necessary.

The objective of the invention therefore is to provide a process for overspray-free application of a resin composition and resin compositions, in particular non-aqueous resin compositions, that can be used in overspray-free application using a print head applicator and that does not have one or more of the above mentioned disadvantages, in particular to provide a non-aqueous resin composition that minimizes or even eliminates sagging defects on the substrate surface but does not result in unacceptable high pressure drops over the perforated plate of the printing head, without significant risk of blocking of the nozzles and providing stable droplet or jet streams ejecting from the holes in the perforated printing plate.

BRIEF SUMMARY OF THE INVENTION

According to one aspect of the invention one or more of the above mentioned problems have been solved by providing a process for overspray-free application of a resin composition on a substrate surface comprising a. Providing a resin composition,
b. Providing an overspray-free applicator comprising a print head comprising a plate comprising a plurality of perforated holes,
c. Ejecting a plurality of droplet streams or jet streams of the resin composition from the plurality of holes on the substrate surface forming a layer of the resin composition, wherein the resin composition is a non-aqueous thixotropic resin composition comprising a resin and a thixotropy agent comprising polyurea particles characterised in that the thixotropic resin composition has a high-shear viscosity HSV measured at 23° C. at a shear rate of 1000±50 $s^{-1}$ that is lower than 100 mPa·s, preferably lower than 90 mPa·s, more preferably lower than 80 mPa·s and even more preferably lower than 70 mPa·s and preferably at least 30 mPa·s, more preferably at least 40 mPa·s, even more preferably at least 50 mPa·s and, a creep compliance Jmax measured after 300 seconds at 23° C. using a creep stress of 1.0 Pa of lower than 250 $Pa^{-1}$, preferably lower than 150 $Pa^{-1}$, even more preferably lower than 50 $Pa^{-1}$ and most preferably lower than 25 $Pa^{-1}$.

It was surprisingly found that the process as described here above ("OFA process") using the specified thixotropic resin composition results in a stable application process with stable jet-streams or droplet streams without blocking of the holes in the applicator head despite of the presence of the polyurea particles resulting in coatings with minimal or no sagging of the applied layer on non-horizontal substrates. The polyurea particles in the thixotropic resin composition having the upper limit in the creep compliance Jmax as specified provide a very fast and substantial viscosity build-up in the thixotropic resin composition when freshly applied on the substrate surface without blocking of the holes and disturbing the jet streams.

In another aspect the invention relates to a non-aqueous thixotropic resin composition, preferably for use in the process of the invention, comprising a resin and a thixotropy agent comprising polyurea particles characterised in that the composition has a) a high-shear viscosity HSV measured at 23° C. at a shear rate of 1000±50 $s^{-1}$ that is lower than 100 mPa·s, preferably lower than 90 mPa·s, more preferably lower than 80 mPa·s and even more preferably lower than 70 mPa·s and preferably at least 30 mPa·s, more preferably at least 40 mPa·s, even more preferably at least 50 mPa·s and
b) a creep compliance Jmax measured at 23° C. after 300 seconds using a creep stress of 1.0 Pa of lower than 250 $Pa^{-1}$, preferably lower than 150 $Pa^{-1}$, even more preferably lower than 50 $Pa^{-1}$ and most preferably lower than 25 $Pa^{-1}$.
c) an amount of polyurea particles between 0.4 and 2.5 cwt %, preferably between 0.5 and 2.0 cwt %, more preferably between 0.6 and 1.8 cwt % or most preferably between 0.7 and 1.7 cwt %, wherein cwt % is the weight % relative to the total weight of the resin composition not including the weight of optional pigments or fillers.

The thixotropic resin composition according to the invention is a non-aqueous composition, which means that the thixotropic resin composition does not comprise substantial amounts of water wherein not substantial means less than 10 cwt %, preferably less than 5 cwt %, more preferably less than 1 cwt % of water wherein cwt % here and hereafter means the weight percentage relative to the total weight of the resin composition, which total weight does not include the weight of pigments or fillers. The non-aqueous thixotropic resin composition may be solvent borne, i.e. comprising organic volatile solvents, or may be solvent free as described below in more detail.

It is known in the art to prevent sagging in spray application by using thixotropy agents. Known thixotropy agents are for example colloidal silica, microgels and anisotropic polyurea particles also referred to as Sag Control Agents (SCA). In normal spray application the amount of SCA can be relatively low because a significant amount of the solvent evaporates from the ejected paint droplets before they contact the substrate surface such that the concentration of the SCA on resin solids and the viscosity has become high enough to provide sufficient anti-sagging effect. However, as solvent evaporation does not substantially occur in OFA application in the ejected droplet streams or jet streams before contacting the substrate, the amounts of SCA in the resin composition needed in such a resin composition would need to be significantly higher. This is perceived as a problem in particular in case of particulate polyurea SCA because the particles are semi-crystalline, anisotropic needle shaped with typical length dimensions of at least 2, preferably at least 5 or even at least 10 times the diameter dimension. The length dimension as indicated by Scanning Electron Microscopy analysis can be tens of microns. The polyurea particles can also have a tendency to form bigger agglomerates in the order of magnitude of the diameter of the holes of the applicator head. Therefore, it was expected that addition of polyurea particles to OFA paints would cause blocking or obstruction of one or more of the very small holes resulting in poor jet stream or drop-on-demand behavior and consequently in poor application results. These problems were also expected to occur if the polyurea particles of the thixotropic resin composition builds-up a space-filling structure under low-shear conditions that is difficult to break down under higher shear conditions. Further, thixotropy agents not only change rheological properties of the resin composition but may also change the properties of the resulting coating, such as the optical surface appearance certainly if high amounts of the thixotropic agent are necessary for the desired rheologic effect. Surprisingly, the non-aqueous thixotropic resin compositions according to the invention do not result in unwanted significantly higher pressure drops over the perforated plate of the OFA-device compared to non-thixotropic analogues. Furthermore, they do not have a negative impact on the formation of the required droplets or jet streams for the thixotropic resin composition exiting the perforated plate and surprisingly it was found that there is no significant risk of blocking of the very small holes despite of the presence of polyurea particles.

In another aspect the invention relates to the use of the non-aqueous thixotropic resin composition according to the invention in an overspray-free application of a coating composition, an adhesive composition or a sealant composition, to a process for coating of an article, preferably an automobile part, comprising applying a coating layer of a thixotropic resin composition according to the invention using the overspray-free application process of the invention on non-horizontal surface of the article and curing the layer to form a cured coating and to coated articles obtainable by the process of the invention, which have a better appearance by having low sagging even on (partially) non-horizontal parts and better coverage on sharp edges.

BRIEF DESCRIPTION OF THE DRAWINGS

FIG. 1 is a graph showing creep compliance measurements at a creep stress of 1.0 Pa for several resin compositions comparing comparative examples No-SCA, CE1 and CE2 having resp. 0, 0.34 and 0.63 cwt % polyurea particles with examples according to the invention Example-1 and Example-4 having resp. 1.24 and 1.6 cwt % high efficient polyurea particles. Only Example 1 and 4 did not show significant sagging.

DETAILED DESCRIPTION OF THE INVENTION

The process for overspray-free application (OFA) of a resin composition on a substrate surface comprises the steps of a) Providing a resin composition,
b) Providing an overspray-free applicator comprising a print head comprising a plate comprising a plurality of perforated holes,
c) Ejecting a plurality of droplet streams or jet streams of the resin composition from the plurality of holes on the substrate surface forming a layer of the resin composition.

In OFA application the print head and the substrate are typically at an application distance between 0.1 and 15 cm, preferably between 0.5 and 12 cm, more preferably between 1 and 10 cm and even more preferably between 2 and 6 cm. The holes generally have a small diameter between 10 and 200 micrometers, preferably between 50 and 150 micrometers, more preferably between 70 and 130 micrometers and the flow rate of the composition through an open hole of the print head is typically between 2 and 10 g/min per hole, preferably between 3 and 9 g/min, more preferably between 4 and 8 g/min. The holes in the perforated print head may not all have the same diameter and at least some of the holes may be provided with means to open and close the hole on demand controlled by a computer control. The print head may also be configured to provide droplet stream instead of a jet stream. The above mentioned flow rates are to illustrate that high amounts of resin composition are ejected from very small holes. As a result, the speed and the shear rates of the resin composition exiting the holes is very high; the speed typically is at least 2, preferably at least 4 more preferably at least 6 and most preferably at least 8 m/s.

Because of the high speed and the close proximity of the jet or droplet streams to the substrate, the streams must be very stable and exiting from the print head in a straight line at an angle perpendicular to the perforated plate. Blocking or obstruction of one or more of the holes must be prevented as it will result in poor jet stream or drop-on-demand behavior and consequently in poor application results. The diameter of the holes is very small and the distance between the holes is also very small because the droplets or jet streams applied on the substrate surface must be close enough to allow forming a film on the surface which also increase the risk that the streams coalesce or depart from the straight line perpendicular to the printhead before they reach the surface. The above OFA process features pose high demands and limitations on the freedom of formulation of the resin composition.

It was surprisingly found that the problem is solved and good results are obtained by using in the OFA process a non-aqueous thixotropic resin composition comprising a resin and a thixotropy agent comprising polyurea particles and is characterised in that the thixotropic resin composition has a) a high-shear viscosity HSV measured at 23° C. at a shear rate of 1000±50 $s^{-1}$ that is lower than 100 mPa·s, preferably lower than 90 mPa·s, more preferably lower than 80 mPa·s and even more preferably lower than 70 mPa·s and preferably at least 30 mPa·s, more preferably at least 40 mPa·s, even more preferably at least 50 mPa·s and
b) a creep compliance Jmax measured at 23° C. after 300 seconds using a creep stress of 1.0 Pa of lower than 250 $Pa^{-1}$, preferably lower than 150 $Pa^{-1}$ and even more preferably lower than 50 $Pa^{-1}$ and most preferably lower than 25 Pa 1.

It is noted that the resin can also be a mixture of different resins as explained in more detail below and that also the thixotropic agent can be a combination of different thixotropic agents, which mixture comprises polyurea particles and one or more other different thixotropic agents, preferably a mixture of two or more different polyurea particles.

The thixotropic resin composition has a low high-shear viscosity (HSV). Here the high-shear viscosity HSV denotes the steady-state viscosity determined at a shear rate of 1000±50 $s^{-1}$ at 23° C. using a state-of-the-art air bearing rheometer, such as the AR2000 from TA Instruments using a cone and plate geometry where the anodized aluminum cone has a diameter of 40 mm, an angle of 4° and a truncation of 107 micrometers. The HSV of the resin composition according to the invention is lower than 100 mPa·s, preferably lower than 90 mPa·s, more preferably lower than 80 mPa·s and even more preferably lower than 70 mPa·s. The required low HSV can be achieved by choosing a relatively low molecular weight resin, so-called high-solid or ultrahigh-solid resin compositions known to those skilled in the art and/or using a relatively high amount of solvent. The HSV of the resin composition preferably is at least 30 mPa·s, preferably at least 40 mPa·s, more preferably at least 50 mPa·s.

When the thixotropic resin composition is applied on the substrate surface the effective shear stress acting on the freshly-applied layer is much lower compared to the high-shear conditions acting on the liquid in the print head and then a very fast and substantial increase of the low-shear viscosity of the thixotropic resin composition according to the invention occurs minimizing sagging problems which is characterised by the upper limit value of the creep compliance Jmax which is determined at 23° C. using a creep stress of 1.0 Pa at a creep time of 300 seconds using a rheometer as described above. A high value of Jmax results in resin compositions with a high sagging tendency whereas resin compositions with the specified low Jmax value will not show substantial sagging defects. The value of Jmax for the thixotropic resin composition according to the invention is lower than 250 $Pa^{-1}$, more preferably lower than 150 $Pa^{-1}$, even more preferably lower than 50 $Pa^{-1}$ and most preferably lower than 25 $Pa^{-1}$. The enormous challenge for OFA paints was to combine a low HSV with a sufficiently low Jmax as these two requirements are severely counter-acting. The lower the HSV, the higher the Jmax and consequently the higher the intrinsic sagging tendency of the paint. For non-thixotropic (Newtonian) paints, the value of Jmax is equal to 300 divided by the HSV. As an example, the value of Jmax for a non-thixotropic Newtonian paint with a viscosity of 75 mPa·s would be 4000 $Pa^{-1}$.

The intrinsic sagging tendency of the thixotropic resin composition during the flash-off drying period at ambient temperatures is thus characterized by the creep compliance Jmax of the thixotropic resin composition determined in a creep test at 23° C. after 300 s at a creep stress of 1 Pa. This creep stress corresponds to the stress due to gravity acting on a vertically oriented wet composition with a layer thickness of 100 micrometer and a specific density of circa 1 g/cc. To simulate the application of the thixotropic resin composition via the overspray-free application device, a high-shear pretreatment is applied prior to the creep test to first remove the structure of the SCA network in the composition which is directly followed by 2 seconds zero shear rate to stop the rotation of the cone and eliminate inertia effects. The creep compliance is hereafter referred to as J and the creep compliance value determined after 300 s using a creep stress of 1.0 Pa is referred to as Jmax. Jmax is defined as the compliance value measured after 300 seconds. The creep compliance is the measured strain divided by the applied creep stress. By definition, the strain and thus the creep compliance are zero at the start of the creep test.

The value of Jmax is determined using a rotational, air bearing rheometer with a cone and plate geometry (anodized aluminum cone with 40 mm diameter and cone angle of 4°). A test sample of the thixotropic resin composition is given, prior to the creep compliance test, a high-shear treatment (30 s at 1000 $s^{-1}$) after which the rotation of the cone is stopped and kept for 2 s at zero shear rate and subsequently the strain is measured at 23° C. using a creep stress of 1.0 Pa and Jmax is the resulting strain divided by the applied creep stress after a creep time of 300 s. The dimension of Jmax is $Pa^{-1}$.

A low creep compliance Jmax hence means a low sagging tendency during the flash-off drying period and thus a good sag resistance. This is illustrated in FIG. 1, which shows a plot of the creep compliance as a function of time for compositions with SCA according to the invention and for a similar composition without SCA. The value of Jmax for the composition without SCA was circa 5000 $Pa^{-1}$ whereas this was circa 14 $Pa^{-1}$ for the thixotropic resin composition Example-4 with SCA. This means that addition of the polyurea particles resulted in a Jmax reduction of more than 99.5%.

The conflicting requirements of low values for HSV on the one hand in order to avoid a high pressure drop over the printing head plate and low values of Jmax on the other hand in order to avoid too high sagging tendency of the resin composition when applied on the substrate surface are particularly difficult to achieve in overspray-free application where no significant solvent evaporation can take place before the composition arrives on the substrate surface.

The inventors have surprisingly found that the thixotropic resin composition can be used in OFA application despite the presence of polyurea particles, even at relatively high concentration of polyurea particles meaning that low values of Jmax combined with the above mentioned low values for HSV can be achieved. In the OFA process the polyurea particles concentration are preferably chosen to be at least 0.4 cwt %, preferably at least 0.5 cwt %, more preferably at least 0.6 cwt % and most preferably at least 0.7 cwt % but can also be higher than 1 cwt % or even more than 1.3 or 1.5 cwt %. However, high concentrations of polyurea particles in the thixotropic resin composition are also a risk for blocking the holes in the OFA applicator and can also negatively influence coating appearance. Therefore, the polyurea particles concentration is preferably lower than 2.5 cwt %, more preferably lower than 2 cwt %, even more preferably lower than 1.8 cwt % and most preferably lower than 1.7 cwt %. Accordingly, in the thixotropic non-aqueous resin composition of the invention the amount of polyurea particles is preferably between 0.4 and 2.5 cwt %, preferably between 0.5 and 2.0 cwt %, more preferably between 0.6 and 1.8 cwt % or most preferably between 0.7 and 1.7 cwt %. wherein cwt % here and hereafter is the weight % relative to the total weight of the non-aqueous thixotropic resin composition not including the weight of optional pigments and fillers.

For application areas with a high demand of sag resistance the polyurea particles concentration in the OFA process can be generally at least 0.4 cwt %, preferably at least 0.7 cwt %, more preferably at least 1.6 cwt % and most preferred at least 1.7 cwt %, usually not more than 2.5 cwt %, preferably not more than 1.7 cwt %. A particularly preferred range for the polyurea particles concentration is from 1.7 to 2.5 cwt %, wherein cwt % is the weight % relative to the total weight of the resin composition not including the weight of optional pigments or fillers. It is a challenge to achieve the desired very strong thixotropic rheological properties of the thixotropic resin composition with minimum disadvantageous effects of the particles on the optical and mechanical properties of the finally cured coating and evidently also to minimize cost. It was found that the objectives can be achieved using thixotropic agents with a very high thixotropic efficiency meaning that the thixotropic agent, when used in a paint composition, results in a high thixotropic effect (lowering of Jmax) at a lower amount of thixotropic agent. Such high efficiency polyurea particles are described below in more detail. To avoid filtration and blocking issues and to avoid that the SCA particles are visible in the cured coating, the polyurea particles used should preferably combine high thixotropic efficiency without presence of substantial concentrations of large particles or large conglomerates of particles. Several methods can be used to determine the size of the polyurea SCA particles and conglomerates. Scanning Electron Microscopy (SEM) can be used to determine the size and morphology of the primary polyurea SCA particles. It is however not very suited to determine the average particle size of the primary polyurea SCA particles as only a very small fraction of particles is captured on the SEM images. Furthermore, SEM is not suitable to determine the size of the largest polyurea SCA particles or conglomerates. A suitable method for determining the average polyurea SCA particle size is laser diffraction as it determines the size and distribution thereof for a very large number of particles. This laser diffraction technique assumes that the scattering particles are spherical hence the particle size determined with this technique is typically smaller than the length of the primary polyurea SCA particles as seen on SEM images. The polyurea particles according to the present invention, typically have an average particle size measured by laser diffraction of typically not more than 20 μm, preferably not more than 15 μm or even more preferably not more than 10 μm, since this may result in visible lumps in the coating as well as increase the risk of filtration and blocking issues during OFA application. Further the volume percentage of particles having a diameter larger than 20 μm is preferably equal or less than 10% and more preferably equal or less than 5%. Preferably the volume percentage of particles having a diameter larger than 10 μm is equal or less than 10% and more preferably equal or less than 5%.

The average particle size is typically checked using laser diffraction using a Malvern Mastersizer 3000 with a He—Ne laser with a wavelength of 632.8 nm, a beam length of 2.4 mm and 42 element array detector, optimised for light scattering measurements, including 2 backscatter detectors. The average particle size is determined as the Volume Moment Mean diameter D[4,3]. Samples were prepared by diluting 1 gram of the thixotropic composition comprising the polyurea particles in 9 grams of butyl acetate. Subsequently, the sample was predisturbed using a vortex mixer for 2-3 minutes until dispersed. The measurement was started when the obscuration was between 10 and 12.5% and the sample had been deaerated and circulated in the measurement cell for at least 30 seconds. Measurement data were analysed using a polydisperse analysis model based on the Mie theory, assuming a particle refractive index of 1.5330, a continuous medium refractive index of 1.4000 and assuming that the particles are completely non-transparent.

A particular suitable way to determine the presence of large particles is by determining the Hegman fineness which is described in more detail below. Furthermore, the space-filling network formed by the polyurea particles should break-down quickly under conditions of high shear conditions such as those occurring in the OFA device. Therefore, next to a very high thixotropic effect, it is also preferred that the thixotropic resin composition of the invention has a Hegman fineness below the applied layer thickness by at least 20%, more preferably by at least 40% or even 60%. In the thixotropic resin composition the Hegman fineness value is preferably less than 40, more preferably less than 20 and most preferably less than 15 micrometers.

The Hegman method is generally evaluated by trained human operators who make visual observations of the surface appearance of an SCA composition "drawdown" sample. The drawdown evaluation typically uses a device known as a "Hegman Fineness Gauge", usually referred to as a "Hegman Gauge", as described in American Society for Testing and Materials (ASTM) Standard D1210 "Standard Test Method for Fineness of Dispersion of Pigment-Vehicle Systems by Hegman-Type Gage". The Hegman gauge comprises a hardened steel (or stainless steel or chrome-plated steel) block (called a Hegman Gauge Block) and a hardened scraper of similar material. The hardened steel block has a flat ground planar surface and has a tapered path machined along its 127 millimeter length. The tapered path is e.g. 50 micrometers deep at one end and the path tapers to a depth of zero at its other end. The Hegman gauge for manual drawdowns has a one-half inch wide path. Calibration scales are marked along the lateral edges of the path. Along one edge the scale is marked in micrometers (designating the depth of the tapered path). A predetermined quantity of paint is deposited at the deep end of the tapered path of the Hegman gauge block. The hardened steel scraper is placed on the steel block and drawn along its length, leaving behind, in the tapered path, a film-like deposit of paint whose thickness tapers from a maximum thickness to a minimum thickness. The operator visually observes the sample and looks for large particles that protrude from the paint film surface. These protrusions are known as "particles", "specks" or "scats". The operator visually determines the location along the gauge where the specks first appear. Because the appearance of the drawdown sample changes as the paste or paint sample begins to dry, a visual observation must be made immediately. Within about ten seconds of the drawdown the operator makes a visual observation of the appearance of the drawdown sample. The operator determines the point along the gauge where a definite pattern of multiple specks appear (dust particles or very few particles are not taken into account). This point is called the "fineness line" or "fineness measurement" and provides an indication of the fineness or quality of the SCA.

The process of the invention relates primarily to a process for OFA application of coating compositions including paints, clear coats, lacquers, varnishes and inks. However, the OFA application process can in principle also be used for other thixotropic resin compositions, for example adhesive or sealant compositions.

The non-aqueous thixotropic resin composition of the invention comprises a resin and a thixotropy agent comprising polyurea particles characterised in that the composition has a) a high-shear viscosity HSV measured at a shear rate of 1000±50 $s^{-1}$ that is lower than 100 mPa·s, preferably lower than 90 mPa·s, more preferably lower than 80 mPa·s and even more preferably lower than 70 mPa·s and preferably at least 30 mPa·s, more preferably at least 40 mPa·s, even more preferably at least 50 mPa·s and b) a creep compliance Jmax measured after 300 seconds using a creep stress of 1.0 Pa of lower than 250 $Pa^{-1}$, preferably lower than 150 $Pa^{-1}$, even more preferably lower than 50 $Pa^{-1}$, and most preferably lower than 25 $Pa^{-1}$, c) an amount of the polyurea particles between 0.4 and 2.5 cwt %, preferably between 0.5 and 2.0 cwt %, more preferably between 0.6 and 1.8 cwt % or most preferably between 0.7 and 1.7 cwt %, wherein cwt % is the weight % relative to the total weight of the resin composition not including the weight of optional pigments or fillers, which non-aqueous thixotropic resin composition preferably is a clear-coat composition not comprising pigments.

In a preferred embodiment the invention relates to a non-aqueous thixotropic resin composition, preferably for use in the process of the invention, comprising a resin and a thixotropy agent comprising polyurea particles characterised in that the composition has a) a high-shear viscosity HSV measured at 23° C. at a shear rate of 1000±50 $s^{-1}$ that is lower than 100 mPa·s, preferably lower than 90 mPa·s, more preferably lower than 80 mPa·s and even more preferably lower than 70 mPa·s and preferably at least 30 mPa·s, more preferably at least 40 mPa·s, even more preferably at least 50 mPa·s and b) a creep compliance Jmax measured at 23° C. after 300 seconds using a creep stress of 1.0 Pa of lower than 250 $Pa^{-1}$, preferably lower than 150 $Pa^{-1}$, more preferably lower than 50 $Pa^{-1}$ and even more preferably lower than 25 $Pa^{-1}$, c) an amount of polyurea particles of generally at least 0.4 cwt %, preferably at least 0.7 cwt %, more preferably at least 1.6 cwt % and most preferred at least 1.7 cwt %, usually not more than 2.5 cwt %, preferably not more than 1.7 cwt %, particularly preferred ranges are from 1.7 to 2.5 cwt %, wherein cwt % is the weight % relative to the total weight of the resin composition not including the weight of optional pigments or fillers.

The polyurea particle thixotropic agent in the thixotropic resin composition can be a reaction product of a polyisocyanate, preferably a di-, or tri-isocyanate and a mono-amine or alternatively a reaction product of a polyamine, preferably a di-, or tri-amine, and a mono-isocyanate wherein preferably the polyurea particles are polyurea particles having high thixotropic efficiency wherein a) the mono-amine, or in the alternative the mono-isocyanate, are at least partially chiral or b) wherein the polyurea particles have been formed in an acoustic vibration assisted process or c) wherein the polyurea particles have been formed in the presence of a resin or d) combinations of two or more of a), b) or c), preferably a combination of a) and b) or more preferably a combination of a), b) and c). The polyurea forms solid particulate and generally anisotropic, e.g. needle shaped particles, having a long axis much larger than the cross-section diameter. The polyurea particles are generally semi-crystalline.

Polyurea particles having high thixotropic efficiency can be formed from polyisocyanates and mono-amines which are at least partially chiral mono-amines or from polyamines and mono-isocyanates which are at least partially chiral. Herein it is preferred that at least an atom to which the isocyanate or amine group is bonded in the chiral mono-amine or chiral mono-isocyanate is chiral. Even more preferred in view of achieving high thixotropic efficiency, the polyurea particles have been formed in the presence of a resin and even more preferred in an acoustic vibration-, preferably ultra-sound-, assisted process. A polyurea obtained in acoustic vibration assisted process has very high thixotropic efficiency even without reacting in the presence of a resin although the forming reaction in the presence of a resin is preferred. Most preferably, the polyurea particles having high thixotropic efficiency are a combination of the above described preferences; a reaction product of a polyisocyanate and an at least partially chiral mono-amine formed in the presence of a resin in an acoustic vibration assisted process.

Preferably, the polyurea particles are reaction product of a polyisocyanate and an amine wherein a) the polyisocyanate is selected from the group consisting of hexamethylene-1,6-diisocyanate (HMDI), its isocyanurate trimer or biuret, trans-cyclohexylene-1,4-diisocyanate, para- and meta-xylylene diisocyanate, toluene diisocyanate, and mixtures thereof; and/or b) the amine is a mono-amine and is a primary amine, preferably an aliphatic amine, more preferably a (substituted) alkylamine, a branched alkylamine or a cycloalkylamine such as hexylamine, cyclohexylamine, butylamine, laurylamine, 3-methoxypropylamine, or (alkylaryl) such amine as benzylamine, R-alpha-methylbenzylamine, S-alpha-methylbenzylamine, 2-phenethylamine or mixtures thereof. A further preferred amine to be used alone or as a mixture with other amines is 3-aminomethylpyridine. Good results were obtained when the polyurea particles comprise a reaction product of benzyl amine and hexamethylene diisocyanate, of 3-Methoxypropylamine and tris-isocyanurate and most preferred of S-alpha-methylbenzylamine and hexamethylene diisocyanate. It is possible to use combinations of these abovementioned SCA's.

It is desired that the clarity and opacity of clearcoats is not negatively impacted by the polyurea particles. Further, the polyurea particles according to the invention should not cause strong discoloration of paints and the coating, such as a brown color.

The thixotropic resin composition preferably has a Hegman fineness value smaller than 40 micrometers, preferably smaller than 20 micrometers and even more preferably smaller than 15 micrometers, which results in better coating appearance and less risk of blocking the holes. Such Hegman fineness is more easily obtained with high efficiency polyurea particles.

Thixotropic resin compositions are known in the art but are designed for standard application methods such as rolling, brushing, spraying etc., but not for OFA application. None of the prior art documents describe the combination of features of the resin composition as specified herein for use in OFA application. Reference is made to details and examples of the prior art processes described below for the preparation process of polyurea particle thixotropic agents.

EP0198519 describes preparing a polyurea SCA in a carrier resin which can be used as a SCA master batch to provide thixotropic properties. Paint formulators typically use a SCA masterbatch as it is practically impossible for a paint formulator to do the SCA particle formation in the envisaged paint composition, which may comprise one or more different resins, and achieve high quality and consistent thixotropic behavior.

EP0192304 describes a polyurea SCA based on isocyanurate for use in a paint composition which is satisfactorily thixotropic also at low curing temperature. EP1641887 and EP1641888 describe a polyurea SCA based on optically active mono- or polyamine or mono- or polyisocyanate. EP1902081 describes a polyurea SCA comprising a first polyurea reaction product of a first polyisocyanate with a first, preferably chiral, amine and a second polyurea reaction product of a second polyisocyanate with a second amine, preferably a non-chiral amine, different from the first polyurea reaction product and precipitated in the presence of the first reaction product.

WO2018083328A1 describes a process for the preparation of polyurea particles, said process comprising contacting and reacting in a liquid medium reactants (I) comprising a polyisocyanate (a) and a mono-amine (b) or reactants (II) comprising a polyamine (a) and a mono-isocyanate (b) to form a polyurea and precipitating the polyurea to form polyurea particles, wherein acoustic vibration is applied during contacting of the reactants or as a post-treatment on the formed polyurea particles or both. It includes thixotropic composition having a relatively high concentration of polyurea particles in an organic non-polymeric solvent with no, or no substantial-, amount of a carrier resin as opposed to the SCA master batch described in EP0198519. The polyurea particles have a high thixotropic efficiency combined with good Hegman fineness. The use of this thixotropic composition in the formulation of paints has the advantage over the use of a masterbatch comprising SCA in a carrier resin that it does not introduce substantial amounts of a carrier resin in the envisaged resin composition that may not be the desired optimal resin for the envisaged properties of the resin composition.

EP1902081 describes polyurea SCA's that are preferred in view of achieving high thixotropic efficiency. Herein, the thixotropic agent SCA comprises a first polyurea reaction product of a first polyisocyanate with a first amine and a second polyurea reaction product of a second polyisocyanate with a second amine different from the first polyurea reaction product precipitated in the presence of the colloidal particles of the first reaction product. Preferably herein the first polyurea comprises chiral reactants and the second polyurea only comprises non-chiral reactants.

The use of the prefix "poly" for polyisocyanates and polyamines indicates that at least two of the mentioned functionalities are present in the respective "poly" compound. It is noted that when a polyurea product is prepared by the reaction product of amines with a polyisocyanate, it is preferred to prepare a diurea product or a triurea product. Preferably, the polyurea reactants used comprise a polyisocyanate and a monoamine.

The polyisocyanates are preferably selected from the group consisting of aliphatic, cycloaliphatic, aralkylene, and arylene polyisocyanates, more preferably from the group consisting of substituted or unsubstituted linear aliphatic polyisocyanates (and their isocyanurates, biurets, uretdiones) and substituted or unsubstituted arylene, aralkylene, and cyclohexylene polyisocyanates.

The polyisocyanate usually contains 2 to 40 and preferably 4 to 12 carbon atoms between the isocyanate (NCO) groups. The polyisocyanate preferably contains at most four isocyanate groups, more preferably at most three isocyanate groups, and most preferably two isocyanate groups. It is even more preferred to use a symmetrical aliphatic or cyclohexylene diisocyanate. Suitable examples of diisocyanates are described in EP1902081 (incorporated by reference in its entirety).

Suitable examples of diisocyanates are preferably selected from the group consisting of tetramethylene-1,4-diisocyanate, pentamethylene-1,5-diisocyanate, hexamethylene-1,6-diisocyanate (HMDI), trans-cyclohexylene-1,4-diisocyanate, dicyclohexylmethane-4,4'-diisocyanate, 1,5-dimethyl-(2,4-[omega]-diisocyanato methyl) benzene, 1,5-dimethyl(2,4-[omega]-diisocyanatoethyl) benzene, 1,3,5-trimethyl(2,4-[omega]-diisocyanato-methyl) benzene, 1,3,5-triethyl(2,4-[omega]-diisocyanatomethyl) benzene, meta-xylylene diisocyanate, para-xylylene diisocyanate, dicyclohexyl-dimethylmethane-4,4'-diisocyanate, 2,4-toluene diisocyanate, 2,6-toluene diisocyanate, and diphenylmethane-4,4'-diisocyanate (MDI). Further suitable polyisocyanates are preferably selected from the group consisting of polyisocyanates based on HMDI, including condensed derivatives of HMDI, such as uretdiones, biurets, isocyanurates (trimers: tris-isocyanurates), and asymmetrical trimers, etc., many of which are marketed as Desmodur® N and Tolonate® HDB and Tolonate® HDT. Particularly preferred polyisocyanates are selected from the group consisting of HMDI, its isocyanurate trimer, its biuret, trans-cyclohexylene-1,4-diisocyanate, para- and meta-xylylene diisocyanate, and toluene diisocyanate. Most preferably, HMDI or its isocyanurate are selected.

In view of environmental interests it is preferred to use in the composition an as high as possible percentage of constituents originating from renewable resources. Therefore, the polyisocyanate in the SCA of the invention preferably is biobased, for example Desmodur ECON7300. Amines from renewable biobased resources are well known in the art (e.g. amino acids).

As will be understood by the person skilled in the art, it is also possible to use conventionally blocked polyisocyanates which generate two or more isocyanates in situ, as long as the blocking agent, after splitting, does not prevent the formation of the rheology modification agent according to the invention. Throughout this document the term "polyisocyanate" is used to denominate all polyisocyanates and polyisocyanate-generating compounds.

In accordance with a preferred embodiment of the invention the amines used to prepare the polyurea product comprise mono-amines. Many monoamines can be used in combination with the polyisocyanates to create polyurea reaction products. Aliphatic as well as aromatic amines can be used, and primary as well as secondary amines.

Preferably, primary amines are used; of these alkylamines and ether-substituted alkylamines are particularly useful in accordance with this invention. Optionally, the amines may comprise other functional groups, such as hydroxy groups, ether groups, ester groups, urethane groups, silane groups or ethylenically unsaturated groups. Preferred monoamines include aliphatic amines, especially aliphatic (optionally ether substituted) alkylamines, branched alkylamines or cycloalkylamines such as cycloheyxlamine, butylamine, hexylamine, laurylamine, or 3-methoxypropylamine, or (alkylaryl) amines such as 2-phenylethylamine, benzylamine, R-alpha-methylbenzylamine and S-alpha-methylbenzylamine as well as mixtures thereof. A further preferred amine to be used alone or as a mixture with other amines is 3-aminomethyl-pyridine.

The polyurea product may be formed from any monoisocyanate or polyisocyanate with any polyamine, or from any monoamine with any polyisocyanate. The polyurea product may be polymeric containing any number of urea groups per polyurea molecule. Preferably, the polyurea product comprises an average number of at least 2 and at most 6 urea bonds per molecule. Preferably, the average number of urea linkages (or urea bonds) in the polyurea molecule is at least 2 and at most 5 per molecule, more preferably at least 2 and at most 4, most preferably at least 2 and at most 3.5. There is no limitation to the molecular weight of the polyurea product. Preferably, the molecular weight is less than 3,000 Dalton, more preferably less than 2,000 Dalton and most preferably less than 1,000 Dalton. Preferably, the molecular weight is higher than 200 Dalton, more preferably higher than 300 Dalton and most preferably higher than 350 Dalton.

Preferably, the polyurea product is formed from a polyisocyanate and a monoamine. Specifically preferred polyurea products are the adducts of (derivatives of) HMDI and benzylamine, the adducts of (derivatives of) HMDI and 3-methoxypropylamine and the adducts of (derivatives) of HMDI and a chiral amine and mixtures thereof. These preferred polyurea adducts are known in the art and generally have a melting point between 60 and 200° C. The use of diamines (e.g. ethylenediamine) as component next to mono-amines may also be an option to create high melting point polyurea. The monoamine or part of the monoamine used to prepare the polyurea product can be a chiral monoamine and polyurea products as described in U.S. Pat. No. 8,207,268 are considered to be part of this invention.

The polyurea formation reaction may be carried out in the presence of an inert solvent, for example acetone, methyl isobutyl ketone, N-methyl pyrrolidone, benzene, toluene, xylene, butyl acetate or an aliphatic hydrocarbon such as petroleum ether, alcohols, and water, or mixtures thereof or more preferably in the presence of a resin which is preferably a resin dissolved in a solvent and can be used as a masterbatch for the final non-aqueous composition. Preferably, the polyurea formation is carried out in the presence of xylene or any other aromatic solvent, butyl acetate, alcohols, water, a resin or a mixture thereof. Here the term "inert" indicates that the solvent does not significantly interfere in the polyurea formation reaction, which means that the amount of polyurea formed when solvent is present is at least 80% of the amount produced when no solvent is present. Particularly if the resin forming the binder is highly reactive with either the amines or the isocyanates, these cannot be premixed to form the polyurea SCA. By the term "highly reactive" is meant here that more than 30% of the amine or isocyanate reacts with the binder before the amine and the isocyanate react to form the polyurea product.

According to a preferred embodiment of the invention, the polyurea particles are prepared as a masterbatch in the presence of a resin and/or in a solvent. This can be done by providing a mixture of the resin and/or the solvent and the isocyanate and then mixing with the amine or by providing a mixture of the resin and/or the solvent and the amine and then mixing with the isocyanate, by mixing a mixture of resin and/or solvent and the amine with a mixture of resin and/or solvent and the isocyanate or by mixing the isocyanate and amine with the resin and/or solvent simultaneously.

The polyurea particles prepared in this way can be used as a masterbatch used for the production of a non-aqueous thixotropic resin composition according to the invention. This masterbatch may contain at least 0.1 mwt %, preferably at least 1 mwt %, more preferably at least 1.5 mwt %, even more preferably at least 2.5 mwt % and most preferably at least 4 mwt %, typically less than 15 mwt %, preferably less than 10 mwt % and most preferably less than 8 mwt % of polyurea particles relative to the total weight of the masterbatch. The masterbatch may further contain polymeric resin material in an amount between 20 and 95 mwt %, preferably between 30 and 85 mwt %, more preferably between 35 and 80 mwt % and most preferably between 40 and 75 mwt %, wherein mwt % is the weight % relative to the total weight of the masterbatch.

Preferably the polyurea particles are formed in a solvent as a masterbatch used for the production of a non-aqueous thixotropic resin composition according to the invention where the masterbatch contains at least 4 mwt %, preferably at least 6 mwt %, more preferably at least 8 mwt %, even more preferably at least 10 mwt % or even at least 15 mwt %, typically less than 40 mwt %, preferably less than 30 mwt % and more preferably less than 25 mwt % of polyurea particles relative to the total weight of the masterbatch. The masterbatch may further contain polymeric resin material in an amount lower than 40 mwt %, preferably lower than 25 mwt %, more preferably lower than 15 mwt % and most preferably lower than 10 mwt %. If the masterbatch contains polymeric resin material, the amount of polymeric resin material is preferably at least 1 mwt %, more preferably at least 8 mwt %.

A masterbatch can be used as the single polyurea particles source used for the production of a non-aqueous thixotropic resin composition according to the invention or may be combined with one or more other polyurea containing masterbatches or other thixotropic agents known in the art.

In order to avoid the visibility of jet stream patterns on the surface of the cured film it is desirable that the paint film still has enough mobility ("fluidity") left in a late stage of paint drying and before it finally crosslinks. This can be achieved if the melting temperature of at least parts of the thixotropy-inducing particulates is chosen such that its particulate nature and hence its impact on the low-shear viscosity is effectively lost at a temperature below the curing temperature.

In accordance with a preferred embodiment of the invention, the melting point ($T_{m1}$) of the polyurea particles comprised in the thixotropic resin composition is more than 10° C. below the intended curing temperature ($T_{cur}$) of the composition. It is further preferred that the melting point of the polyurea particles is greater than 60° C. but more than 10° C. below the curing temperature of the composition in which the polyurea particles are used (i.e. 60° C.$<T_{m1}<T_{cur}-$10° C.). It is also preferred that the melting temperature ($T_{m1}$) of said polyurea particles is higher than ($T_{cur}$−80° C.), more preferably higher than ($T_{cur}$−60° C.) and even more preferably higher than ($T_{cur}$−40° C.).

The values for the melting points of polyurea particles are obtained from differential scanning calorimetry (DSC) experiments after drying of the sample at room temperature. DSC experiments are typically conducted using a TA Instruments Q2000 and aluminum, hermetic sealed crucibles containing 10+/−5 mg material. The sample is first cooled to −90° C. and isothermally conditioned for 20 minutes. Following this, the temperature is increased at a rate of 10° C./min to a temperature of 210° C. The temperature program is run under nitrogen atmosphere (25 ml/min). The melting point of the polyurea particles results in a small endothermic peak visible in the recorded heat flow in the first heating run and is defined as the onset of this endothermic peak (tangent method).

It is also possible that small amounts of co-reactive components are intentionally employed in the preparation reaction of the polyurea product to act as crystallization modifiers, and more particularly to modify the crystal sizes upon precipitation or the colloidal stability of the resulting crystals. Equally, dispersant and other adjuvants may be present in any of these introduction steps. The preparation of the polyurea products may be carried out in any convenient manner, generally with the reactants being vigorously stirred, in a batch or in a continuous process. Amine components may be added to isocyanate or isocyanate may be added to amine components, whichever is most convenient. Alternatively the polyurea product can be formed in a separate reaction and mixed with the resin usually under proper stirring. The relative molar ratio amine groups to isocyanate groups forming the polyurea particles is usually between 0.9 and 1.1, preferably between 0.95 and 1.05.

The polyurea thixotropic agent can be a mixture of different types of polyurea particles and/or can further comprise other thixotropic agents known in the art, such as, but not limited to, silica, (polymeric) amides, (inorganic) clays, microgels, waxes or mixtures thereof.

According to a preferred embodiment of the invention, and especially when the thixotropic resin composition is intended to be cured at a temperature ($T_{cur}$) greater than 60° C., said thixotropic resin composition comprises: (a) polyurea particles having a melting point ($T_{m1}$) at least 10° C. below the intended curing temperature ($T_{cur}$), thereby satisfying the requirement $T_{m1}<(T_{cur}-10° C.)$; and (b) a second thixotropy-inducing particulate component that retains its particulate nature at temperatures at least up to said curing temperature. Preferably the second thixotropy-inducing particulate component (b) contains polyurea particles, especially those as described here above, having a melting point $T_{m2}$ of at least the curing temperature $T_{cur}$.

Preferably the ratio of the polyurea particles (a) to the second thixotropy-inducing particulate component (b) (by weight) in the thixotropic resin composition is greater than 5:95, more preferably greater than 10:90 and most preferably greater than 20:80. Furthermore, preferably the ratio of the polyurea product (a) to the second component (by weight) in the thixotropic resin composition is lower than 95:5, more preferably lower than 90:10 and most preferably lower than 80:20.

According to a specially preferred embodiment of the invention, especially when the thixotropic resin composition is intended to be cured at a temperature ($T_{cur}$) greater than 60° C., said thixotropic resin composition contains a resin and a thixotropy agent comprising polyurea particles having a melting temperature ($T_{m1}$) at least 10° C. below the intended curing temperature characterised in that the composition has a) a high-shear viscosity HSV measured at a shear rate of 1000±50 $s^{-1}$ that is lower than 100 mPa·s, preferably lower than 90 mPa·s, more preferably lower than 80 mPa·s and even more preferably lower than 70 mPa·s and preferably at least 30 mPa·s, more preferably at least 40 mPa·s, even more preferably at least 50 mPa·s and b) a creep compliance Jmax measured after 300 seconds using a creep stress of 1.0 Pa of lower than 100 $Pa^{-1}$, preferably lower than 50 $Pa^{-1}$ and even more preferably lower than 25 $Pa^{-1}$, c) an amount of polyurea particles generally at least 0.4 cwt %, preferably at least 0.7 cwt %, more preferably at least 1.6 cwt % and most preferred at least 1.7 cwt %, usually not more than 2.5 cwt %, preferably not more than 1.7 cwt %, particularly preferred ranges are from 1.7 to 2.5 cwt %, wherein cwt % is the weight % relative to the total weight of the resin composition not including the weight of optional pigments or fillers.

which non-aqueous thixotropic resin composition preferably is a clear-coat composition not comprising pigments.

A resin composition is herein defined as a liquid comprising a resin which after application on a substrate turns into a solid resin by evaporation of a diluent and/or by crosslinking reaction which results in a dried and/or cured solid resin In view of achieving sufficient mechanical properties of the resulting solid resin, the resin in the resin composition is preferably crosslinkable or the resin must have a high molecular weight of preferably at least 2000 g/mol. It is preferred in view of the envisaged chemical and mechanical properties of the resulting solid resin that the resin in the resin composition is a crosslinkable resin. A crosslinkable resin comprises one or more crosslinkable resin components that comprise reactive functional groups that react to form a crosslinked network throughout the volume of the cured solid resin. The crosslinkable resin can comprise crosslinkable components comprising two or more functionals group A that can react with each other (A-A: for example ethylenically unsaturated groups) or comprising crosslinkable components comprising two or more different reactive functional groups that react with each other (A-B for example; hydroxyl-isocyanate, carboxylic acid/epoxy, hydroxyl/amino-resin, Michael donor-acceptor etc). The reactive functional groups A and B can be on one crosslinkable resin component or on two or more separate resin components. In embodiments wherein the molecular weight of the resin component A is substantially higher (at least 2 or 3 times higher) than that of resin component B, the resin component A is called either the film-forming resin component or the binder resin component a1) and the resin component B is called the crosslinker component b). The crosslinkable resin composition may comprise a crosslinking catalyst c).

The resin composition may comprise a diluent to lower viscosity, in particular the HSV, of the resin composition. A diluent in general can be a volatile organic solvent or water or a reactive diluent. Because resins are normally hydrophobic in view of the desired properties of the resulting solid resin, water is not a suitable solvent. Water can be a dispersion medium, but the present invention does not cover resin compositions that are aqueous dispersions. Therefore, the resin compositions are non-aqueous and comprise substantially no water. Substantially-no water means less than 10, preferably less than 5, 3, 2 or even less than 1 cwt %. The volatile organic solvent and any insubstantial amount of water, if present, evaporate after application to form the solid resin. Reactive diluent reacts with the crosslinkable components on curing and becomes part of the solid resin, so these can be added to lower the viscosity without decreasing the resin solids content.

Thus, in one embodiment (I), the resin composition is a non-aqueous solvent-borne resin composition comprising a resin, an organic volatile solvent and substantially no water, wherein preferably the resin is a crosslinkable resin which preferably comprises a film-forming resin component and a crosslinking resin component. In another embodiment (II), the resin composition is a non-aqueous solvent-free resin composition comprising crosslinkable resin and substantially no organic solvent and substantially no water, wherein the crosslinkable resin preferably is a polymeric, oligomeric or monomeric resin or combinations thereof, optionally comprising reactive diluents.

The resin composition of embodiment (I) preferably comprises a film-forming resin component A having hydroxyl-, carboxyl or epoxy functional groups and a crosslinker component B comprising functional groups reactable with the functional groups of resin component A. The resin composition of embodiment (II) most preferably comprises a crosslinkable resin having ethylenically unsaturated functional groups that are UV curable.

The resin in the non-aqueous thixotropic resin composition is broadly defined. The resin composition can be a coating composition, for example a solvent-born paint or a clear coat composition, but also a actinic radiation, e.g. UV curable composition. The resin composition can also be an adhesive composition comprising an adhesive resin of a sealant composition comprising a sealant resin.

In a preferred embodiment (I), the non-aqueous thixotropic resin composition according to the invention is a non-aqueous solvent-borne thixotropic resin composition, preferably a coating composition, which more preferably is a clear coat composition not comprising pigments, comprises a) a crosslinkable resin in a total amount preferably from 30 to 90, preferably from 40 to 80, more preferably from 45 to 70 cwt %, wherein preferably the crosslinkable resin comprises a film forming resin component comprising reactive functional groups A and a crosslinking resin component comprising functional groups B as described in more detail below, b) a volatile solvent in an amount between 10 and 70, preferably 20-60 and more preferably 30-65 cwt %, c) polyurea particles in an amount between 0.4 and 2.5 cwt %, preferably between 0.5 and 2.0 cwt %, more preferably between 0.6 and 1.8 cwt % or most preferably between 0.7 and 1.7 cwt %, d) optional crosslinking catalyst from 0 to 10, preferably from 0.002 to 5, more preferably from 0.005 to 1 cwt %. In this non-aqueous solvent-borne thixotropic resin composition of embodiment (I), the amount of the polyurea particles, preferably the highly efficient polyurea particles, is between 0.8 and 5 rwt %, preferably between 1.2 and 4 rwt % and more preferably between 1.5 and 3.5 rwt % or most preferably between 2 and 3.5 rwt % wherein rwt % is the weight % relative to the total resin solids weight in the composition. The resin solids weight is the total weight of the thixotropic resin composition minus the weight of solvents and minus the weight of pigments, fillers and the polyurea particles. The resin solids weight includes the solids weight of the crosslinking agent or reactive diluents if present. It is noted that apart from resin solids the term NVM is used which includes any non-volatile material after drying or curing as determined according to ISO 3251 and which includes the resin solids and polyurea particles and other solids if present such as pigments and fillers.

In another preferred embodiment (II), the non-aqueous thixotropic resin composition according to the invention is non-aqueous a solvent-free thixotropic resin composition comprising a) polymeric, oligomeric and/or monomeric resin components having a UV curable functional group, preferably an ethylenically unsaturated group, more preferably (meth-) acryloyl, b) between 0.4 and 2.5 cwt %, preferably between 0.5 and 2.0 cwt %, more preferably between 0.6 and 1.8 cwt % or most preferably between 0.7 and 1.7 cwt % of polyurea particles, c) optionally, from 0.001 to 10, preferably from 0.002 to 8, more preferably from 0.005 to 6 cwt % of photo-initiator. This composition may further optionally comprise other components for instance to improve adhesion, to lower shrinkage or pigments in amounts preferably less than 30, 20, 10 or even less than 5 cwt %.

In a preferred embodiment the resin composition of the invention comprises as the resin at least one film forming resin a1). Film forming resin a1) is a monomer, oligomer or polymer or mixtures thereof, preferably film forming resin a1) is a polymer or oligomer. There are no principal limitations to the type of polymer or oligomer backbone of film forming resin a1). Preferably the film forming resin a1) is selected from the group consisting of polyester resins, (meth)acrylic resins, polycarbonate resins, polyether resins, polyurethane resins, amino resins, and mixtures and hybrids thereof. Such polymers are generally known to the skilled person and are commercially available. The thixotropic resin composition of the invention may comprise more than one type of film forming resin a1), which may have a similar or different backbone.

Film forming resin a1) preferably comprising functional groups reactable with crosslinker b) and/or with another film forming resin a1) which can be the same or different from a1). The functional groups can be any functional group. Preferred functional groups are hydroxy, primary amine, secondary amine, mercaptane, carboxylic acid, epoxide or activated unsaturated C═C moieties. More preferred functional groups are hydroxy, primary amine, epoxide. Most preferred functional groups are hydroxy groups.

Functional groups can also be blocked by a chemical reaction, such as for example a ketimine as a blocked version of a primary amine blocked by a ketone. A person skilled in the art is well aware of such chemical blockers. Film forming binders a1) may comprise more than one type of functional groups. These different types of functional groups may be present in the same or in different molecules.

Of the wide variety of potentially suitable film forming binders a1), preferred are the polyester resins, polyurethane resins and (meth)acrylic resins, amino resins, or mixtures or hybrids thereof.

The film forming resin a1) used in the thixotropic resin composition of the invention has no limitations in molecular weights Mn and Mw. Preferably, film forming resin a1) has a weight averaged molecular weight Mw of less than 30,000 Dalton, more preferably less than 10,000 Dalton, most preferably less than 5,000 Dalton. Preferably, film forming resin a1) has an Mw of at least 1,000 Dalton, preferably 2,000 Dalton and more preferably 3,000 Dalton.

The number averaged molecular weight Mn of film forming resin a1) is preferably at most 10,000 Dalton, more preferably at most 5,000 Dalton, most preferably at most 3,000 Dalton. The polydispersity of the molecular weight distribution of film forming resin a1), determined by dividing the weight averaged molecular weight Mw by the number averaged molecular weight Mn, is preferably between 1 and 10, more preferably between 1.5 and 6 and most preferably between 1.7 and 4. The Mn of the film forming resin a1) is preferably at least 700 Dalton, preferably at least 1,000 Dalton, more preferably at least 2,000 Dalton.

The glass transition temperature Tg of film forming resin a1) is preferably higher than −80° C., more preferably higher than −40° C., most preferably higher than −30° C. The glass transition temperature of film forming resin a1) does preferably not exceed 100° C., more preferably 90° C., most preferably 80° C. The glass transition temperature Tg is typically determined in accordance with ASTM provision D3418-03, via Differential Scanning calorimetry (DSC), with a heating rate of 10° C./min.

The film forming resin a1) has an equivalent weight in the range of 50 to 2500 grams of resin a1) per mole of functional groups, preferably in the range of 80 to 400 grams of resin a1) per mole of functional groups, and more preferably in the range of 100 to 300 grams of resin a1) per mole of functional groups.

According to a first especially preferred embodiment of the film forming resin a1), the resin a1) is a polyol. The polyols a1) comprise on average at least 2, preferably more than 2, —OH groups. Preferably polyols a1) comprise on average at least 2.2 —OH groups, more preferably on average at least 2.5 —OH groups. The polyols a1) are preferably selected from the group consisting of polyester polyols, (meth)acrylic polyols, polycarbonate polyols, polyether polyols, polyurethane polyols, and mixtures and hybrids thereof. Such polymers are generally known to the skilled person and are commercially available. Of the wide variety of potentially suitable polyols a1), the polyols a1) are preferably selected from the group consisting of polyester polyols and (meth)acrylic polyols, as well as mixtures and hybrids thereof, as further described here under. Suitable polyester polyols can be obtained, for instance, by the polycondensation of one or more di- and/or higher functional hydroxy compounds with one or more di- and/or higher functional carboxylic acids, C1-C4 alkyl esters and/or anhydrides thereof, optionally in combination with one or more monofunctional carboxylic acids and/or C1-C4 alkylesters thereof and/or monofunctional hydroxy compounds.

Non-limiting examples of monocarboxylic acids are linear or branched alkyl carboxylic acids comprising 4 to 30 carbon atom, such as stearic acid, 2-ethylhexanoic acid and isononanoic acid. As non-limiting examples, di- and/or higher functional hydroxy compounds can be one or more alcohols selected from the group consisting of ethylene glycol, neopentyl glycol, 1,3-propanediol, 1,4-butanediol, isosorbide, spiroglycol, trimethylol propane, glycerol, trihydroxyethyl isocyanurate and pentaerythritol. As non-limiting examples, the di- and/or higher functional carboxylic acids are one or more selected from the group consisting of succinic acid, adipic acid, sebacic acid, 1,4-cyclohexyl dicarboxylic acid, hexahydrophthalic acid, terephthalic acid, isophthalic acid, phthalic acid and functional equivalents thereof. Polyester polyols can be prepared from di and/or higher functional hydroxy compounds and from carboxylic acids, and/or anhydrides and/or C1-C4 alkyl esters of the acids.

Typical preferred acid values of the polyols is less than 15, preferably less than 10, most preferably less than 8 mg KOH/g. The acid value can be determined according to ISO 3682-1996. Suitable (meth)acrylic polyols can be obtained, for instance, by the (co)polymerization of hydroxy-functional (meth)acrylic monomers with other ethylenically unsaturated comonomers in the presence of a free radical initiator. As a non-limiting example, the (meth)acrylic polyol can include residues formed from the polymerization of one or more hydroxyalkyl esters of (meth)acrylic acid, such as for example hydroxyethyl (meth)acrylate, hydroxypropyl (meth)acrylate, hydroxybutyl (meth)acrylate, polyethylene glycol esters of (meth)acrylic acid, polypropylene glycol esters of (meth)acrylic acid, and mixed polyethylene glycol and polypropylene glycol esters of (meth)acrylic acid. The (meth)acrylic polyol further preferably comprises monomers not containing hydroxyl groups such as methyl (meth)acrylate, tert-butyl (meth)acrylate, isobornyl (meth) acrylate, isobutyl (meth)acrylate, (substituted) cyclohexyl (meth)acrylate, (meth)acrylic acid. The (meth)acrylic polyol optionally comprises non-(meth)acrylate monomers such as styrene, vinyl toluene or other substituted styrene derivatives, vinyl esters of (branched) monocarboxylic acids, maleic acid, fumaric acid, itaconic acid, crotonic acid and monoalkylesters of maleic acid.

According to a second preferred embodiment, polyol a1) comprises a mixture of more than one polyol a1), in particular a mixture of at least one (meth)acrylic polyol a1) and at least one polyester polyol a1) as described for the preferred embodiments here above.

The polyol a1) can be a so-called hybrid polyacrylate polyester polyol, wherein the (meth)acrylic polyol is prepared in situ in the polyester polyol. The (meth)acrylic polyol and polyester polyol are preferably obtained with the same monomers as described here above for the (meth) acrylic polyol and the polyester polyol.

According to a third especially preferred embodiment, the film forming resin a1) comprises an amino resin, preferably a melamine-formaldehyde resin. Melamine-formaldehyde resins are very well known and have been commercialized since long, and may be obtained from Allnex under the tradenames of CYMEL® and SETAMINE®. These melamine-amino resins, optionally in solution in corresponding organic solvents, comprise products with various degrees of methylolation, degrees of etherification or degrees of condensation (monocyclic or polycyclic).

According to a fourth especially preferred embodiment, the film forming resin a1) comprises functionalities which are activated unsaturated C═C moieties (RMA acceptor group). According to this fourth preferred embodiment the film forming resin a1) is a (meth)acryloyl compound, preferably an acryloyl compound. Suitable film forming resins having ethylenically unsaturated functional groups, in which the carbon-carbon double bond is activated by an electron-withdrawing group (RMA donor group), e.g. a carbonyl group in the alpha-position, are disclosed in U.S. Pat. No. 2,759,913 (column 6, line 35 through column 7, line 45), DE-PS-835809 (column 3, lines 16-41), U.S. Pat. No. 4,871,822 (column 2, line 14 through column 4, line 14), U.S. Pat. No. 4,602,061 (column 3, line 14 through column 4, line 14), U.S. Pat. No. 4,408,018 (column 2, lines 19-68) and U.S. Pat. No. 4,217,396 (column 1, line 60 through column 2, line 64).

The film forming resin a1) according to this fourth preferred embodiment are preferably acrylates, fumarates and maleates. Most preferably, such a film forming resin a1) is an unsaturated acryloyl functional component. Said components having activated unsaturated C═C moieties can be selected from a first preferred group of acrylic esters of components containing 2-6 hydroxyl groups and 1-30 carbon atoms. These esters may optionally contain hydroxyl groups. Especially preferred examples include trimethylolpropane triacrylate, pentaerythritol triacrylate and di-trimethylolpropane tetraacrylate. Other suitable compounds may be selected from the group of resins such as polyesters, polyurethanes, polyethers, epoxy resins, and/or alkyd resins containing pendant activated unsaturated groups. Preferably, other suitable compounds may be selected from the group of resins such as polyesters, polyurethanes, polyethers, and/or alkyd resins containing pendant activated unsaturated groups. These include, for example, urethane acrylates obtained by reaction of a polyisocyanate with an hydroxyl group-containing acrylic ester, e.g., an hydroxyalkyl ester of acrylic acid or a component prepared by esterification of a polyhydroxyl component with less than a stoichiometric amount of acrylic acid; polyether acrylates obtained by esterification of an hydroxyl group-containing polyether with acrylic acid; polyfunctional acrylates obtained by reaction of an hydroxyalkyl acrylate with a polycarboxylic acid and/or a polyamino resin; polyacrylates obtained by reaction of acrylic acid with an epoxy resin; and polyalkylmaleates obtained by reaction of a monoalkylmaleate ester with an epoxy resin and/or an hydroxy functional oligomer or polymer. Such compounds are very well known and have been commercialized since long, and may be obtained from Allnex under the tradename of EBECRYL®. Apart from acryloyl esters a class of suitable components are acrylamides. In addition to the previously described film forming binders a1) having (at least) two functional groups, it is also possible to use monomeric film forming binders a1) having at least one functional group. For example, ethylenically unsaturated comonomers can be used in this fourth preferred embodiment, such as esters of (meth)acrylic acid, such as hydroxyethyl (meth)acrylate, hydroxypropyl (meth)acrylate, hydroxybutyl (meth)acrylate, polyethylene glycol esters of (meth)acrylic acid, polypropylene glycol esters of (meth)acrylic acid, and mixed polyethylene glycol and polypropylene glycol esters of (meth)acrylic acid, methyl (meth) acrylate, tert-butyl (meth)acrylate, isobornyl (meth)acrylate, isobutyl (meth)acrylate, (substituted) cyclohexyl (meth) acrylate, (meth)acrylic acid. Also non-(meth)acrylate ethylenically unsaturated comonomers such as styrene, vinyl toluene or other substituted styrene derivatives, vinyl esters of (branched) monocarboxylic acids, maleic acid, fumaric acid, itaconic acid, crotonic acid and monoalkylesters of maleic acid can be used.

The thixotropic resin composition of the invention optionally comprises a crosslinker component b). Crosslinker component b) generally comprises an oligomeric or polymeric compound with at least two functional groups reactable with film forming resin a1). Crosslinker b) is preferably selected from amino crosslinkers such as melamine-formaldehyde resins and formaldehyde free based resins, isocyanates or blocked isocyanates or mixtures of melamine-formaldehyde resins with (blocked) isocyanates.

Melamine-formaldehyde resins are very well known and have been commercialized since long, and may be obtained from Allnex under the tradenames of CYMEL® and SETAMINE®. These melamine-formaldehyde resins, optionally in solution in corresponding organic solvents, comprise products with various degrees of methylolation, degrees of etherification or degrees of condensation (monocyclic or polycyclic). Preferred amino crosslinker resins are sold under the names of CYMEL 202, CYMEL 232, CYMEL 235, CYMEL 238, CYMEL 254, CYMEL 266, CYMEL 267, CYMEL 272, CYMEL 285, CYMEL 301, CYMEL 303, CYMEL 325, CYMEL 327, CYMEL 350, CYMEL 370, CYMEL 701, CYMEL 703, CYMEL 736, CYMEL 738, CYMEL 771, CYMEL 1141, CYMEL 1156, CYMEL 1158, CYMEL 1168, CYMEL NF 3041, CYMEL NF 2000, CYMEL NF 2000A, SETAMINE US-132 BB-71, SETAMINE US-134 BB-57, SETAMINE US-138 BB-70, SETAMINE US-144 BB-60, SETAMINE US-146 BB-72, SETAMINE US-148 BB-70 and mixtures thereof. Particularly preferred are SETAMINE US-138 BB-70, CYMEL 327, CYMEL NF 2000 and CYMEL NF 2000A.

Crosslinker component b) can also comprise an isocyanate compound with at least two free —NCO (isocyanate) groups. Isocyanate crosslinkers are well known and have extensively been described in the art. The isocyanate compound is usually selected from aliphatic, cycloaliphatic, and aromatic polyisocyanates comprising at least 2 —NCO groups and mixtures thereof. The crosslinker b) is then preferably selected from hexamethylene diisocyanate, 2,4,4-trimethyl hexamethylene diisocyanate, 1,2-cyclohexylene diisocyanate, 1,4-cyclohexylene diisocyanate, 4,4'-dicyclohexylene diisocyanate methane, 3,3'-dimethyl-4,4'-dicyclohexylene diisocyanate methane, norbornane diisocyanate, m- and p-phenylene diisocyanate, 1,3- and 1,4-bis (isocyanate methyl) benzene, xylylene diisocyanate, α,α,α',α'-tetramethyl xylylene diisocyanate (TMXDI), 1,5-dimethyl-2,4-bis (isocyanate methyl) benzene, 2,4- and 2,6-toluene diisocyanate, 2,4,6-toluene triisocyanate, 4,4'-diphenylene diisocyanate methane, 4,4'-diphenylene diisocyanate, naphthalene-1,5-diisocyanate, isophorone diisocyanate, 4-isocyanatomethyl-1,8-octamethylene diisocyanate, and mixtures of the aforementioned polyisocyanates. Other preferred isocyanate crosslinkers are the adducts of polyisocyanates, e.g., biurets, isocyanurates, imino-oxadiazinediones, allophanates, uretdiones, and mixtures thereof. Examples of such adducts are the adduct of two molecules of hexamethylene diisocyanate or isophorone diisocyanate to a diol such as ethylene glycol, the adduct of 3 molecules of hexamethylene diisocyanate to 1 molecule of water, the adduct of 1 molecule of trimethylol propane to 3 molecules of isophorone diisocyanate, the adduct of 1 molecule of pentaerythritol to 4 molecules of toluene diisocyanate, the isocyanurate of hexamethylene diisocyanate (available under the trade name DESMODUR® (E) N3390 or TOLONATE® HDT-LV, TOLONATE® HDT-90, a mixture of the uretdione and the isocyanurate of hexamethylene diisocyanate, under the trade name DESMODUR® N3400, the allophanate of hexamethylene diisocyanate, available under the trade name DESMODUR® LS 2101, and the isocyanurate of isophorone diisocyanate, available under the trade name VESTANAT® T1890. Furthermore, (co)polymers of isocyanate-functional monomers such as α,α'-dimethyl-m-isopropenyl benzyl isocyanate are suitable for use. If desired, it is also possible to use hydrophobically or hydrophilically modified polyisocyanates to impart specific properties to the coating.

Crosslinker component b) can also comprise blocked isocyanates when blocking agents having a sufficiently low deblocking temperature are used to block any of the polyisocyanate crosslinker component b) mentioned above. In that case, crosslinker component b) is substantially free of unblocked isocyanate group-containing compounds and the crosslinkable composition can be formulated as one-component formulation. The blocking agents which can be used to prepare a blocked isocyanate component are well-known to the skilled worker.

Generally, the weight percentage of crosslinker component b) to the sum of film forming resin a1), polyurea particles a2), crosslinker component b) and if present catalyst c) in the composition, is between 10 and 89%, preferably between 20 and 80%.

The crosslinkable thixotropic resin composition can optionally comprise a catalyst c) for catalysing the reaction between the functional groups of film forming resin a1) and crosslinker b) and/or the functional groups of film forming resin a1) with itself and/or film forming resin a1'). The person skilled in the art will know that the type of catalyst c) will in general depend on the type of crosslinker component. In one embodiment, catalyst c) is an organic acid, more particularly selected from sulfonic acids, carboxylic acids, phosphoric acids and/or acidic phosphoric esters. Preferred are sulfonic acids. Examples of suitable sulfonic acids are dodecylbenzenesulfonic acid (DDBSA), dinonylnaphthalenedisulfonic acid (DNNSA), para-toluenesulfonic acid (pTSA). An acid catalyst can be also used in blocked form. As a result, as is known, improvement is obtained in, for example, the shelf life of the compositions comprising blocked catalysts. Examples of suitable agents for blocking acid catalysts are amines such as preferably tertiary-alkylated or heterocyclic amines. Blocked sulfonic acid catalysts can for example be blocked DDBSA, blocked DNNSA or blocked pTSA. This blocking of the sulfonic acid catalysts takes place, for example, likewise via amines such as preferably tertiary-alkylated or heterocyclic amines, such as 2-amino-2-methylpropanol, diisopropanolamine, dimethyloxazolidine or trimethylamine, for example. Alternatively, $NH_3$, optionally dissolved in an organic solvent or in water, can be used to block sulfonic acid catalysts. Also possible is the use of covalently blocked sulfonic acid catalysts. In this case, blocking takes place using covalently bonding blocking agents such as epoxy compounds or epoxy-isocyanate compounds, for example. Blocked sulfonic acid catalysts of these kinds are described in detail in the patent publication U.S. Pat. No. 5,102,961. Catalysts are available, for example, under the trade name CYCAT® (from allnex) or NACURE®, and can be used directly in the composition of the invention.

In another embodiment, the catalyst c) is a metal-based catalyst. Preferred metals in the metal-based catalyst include tin, bismuth, zinc, zirconium and aluminium. Preferred metal-based catalysts c) are carboxylate or acetylacetonate complexes of the aforementioned metals. Preferred metal-based catalysts c) optionally used in the invention are tin, bismuth and zinc carboxylates, more specifically preferred are dimethyl tin dilaurate, dimethyl tin diversatate, dimethyl tin dioleate, dibutyl tin dilaurate, dioctyl tin dilaurate, and tin octoate, zinc 2-ethylhexanoate, zinc neodecanoate, bismuth 2-ethylhexanoate, bismuth neodecanoate. Also suitable are dialkyl tin maleates, and dialkyl tin acetates. It is also possible to use mixtures and combinations of metal-based catalysts, mixtures of (blocked) acid catalysts and mixtures of metal-based catalysts with (blocked) acid catalysts.

Typically, the catalyst c) is present in the composition according to the invention in an amount between 0 and 10, preferably from 0.001 to 5, more preferably from 0.002 to 5, most preferably from 0.005 to 1, % by weight of the total amount of film forming resin a1), polyurea product a2), crosslinker b) and catalyst c).

The composition according to the invention may optionally comprise one or more of a volatile organic compound d). In general, these are compounds with a boiling point at atmospheric pressure of 200° C. or less. Suitable volatile organic compounds d) may be selected from, but are not limited to, hydrocarbons, such as toluene, xylene, Solvesso 100, Solvesso 150, ketones, terpenes, such as dipentene or pine oil; halogenated hydrocarbons, such as dichloromethane; ethers, such as ethylene glycol dimethyl ether; esters, such as ethyl acetate, ethyl propionate, n-butyl acetate; ether esters, such as methoxypropyl acetate, butyl glycol acetate and ethoxyethyl propionate; alcohols, such as n-butanol and 2-ethylhexanol. Also mixtures of these compounds can be used.

Usually, the composition according to the invention can be diluted with such volatile organic compounds to the desired HSV of the thixotropic resin composition according to the invention as described above. Preferably, the coating composition according to the invention comprises less than 700 g/l of volatile organic compound d) based on the total composition, more preferably less than 550 g/l, and even more preferably 500 g/l and most preferably less than 420 g/L at application viscosity.

The thixotropic resin composition according to the invention can also comprise a reactive diluent. Reactive diluents generally are monomeric or oligomeric liquid compounds comprising at least one functional group which is similar or different compared to the functional groups in film forming resin a1) and/or crosslinker b) and are used to reduce the high shear viscosity of the thixotropic resin composition and which can react with the functional groups of film forming resin a1) and/or crosslinker b). Preferably, reactive diluents are not volatile (having a boiling point at atmospheric pressure that is higher than 200° C.) and therefore do not contribute to the total volatile organic content of the composition. Optionally, the thixotropic resin composition of the invention comprises a reactive diluent in an amount of between 0 to 45% by weight relative to the total weight of film forming resin a1), polyurea compound a2) and reactive diluent. Optionally the thixotropic resin composition according to the invention comprises a reactive diluent in an amount of between 0 to 20% by weight relative to the total weight of film forming resin a1), polyurea compound a2), optional crosslinker b), optional catalyst c) and reactive diluent.

In addition to the components described above, other compounds can be present in the thixotropic resin composition according to the present invention. Such compounds may be binder resins other than film forming resin a1), optionally comprising reactive groups which may be crosslinked with the aforesaid film forming binders a1) and/or crosslinkers b). Examples of such other compounds are ketone resins, and latent amino-functional compounds such as oxazolidines, ketimines, aldimines, and di-imines. These and other compounds are known to the skilled person and are mentioned, int. al., in U.S. Pat. No. 5,214,086. The amount of such binders is usually less than 30% by weight.

The crosslinkable composition may further comprise other ingredients, additives or auxiliaries commonly used in coating compositions. These can comprise additives which are commonly used in smaller amounts to improve certain important paint properties, preferably less than 10 wt %, usually less than 5 wt %. These additives may comprise a volatile part comprising a solvent with a boiling point at atmospheric pressure of 200° C. or less and a non-volatile part. Non-limiting examples of such additives are for example surfactants, pigment dispersion aids, levelling agents, wetting agents, anti-cratering agents, antifoaming agents, heat stabilizers, light stabilizers, thixotropic agents other than polyurea particles a2), UV absorbers and antioxidants.

The thixotropic resin composition may further comprise reactivity moderators. Such reactivity moderators can comprise compounds to increase the pot-life of the thixotropic resin composition. These types of pot-life increasing reactivity moderators are well-known to those skilled in the art. Another type of reactivity moderator particularly useful in the crosslinkable composition according to the invention are photochemical initiators capable of initiating the polymerization of an actinic radiation curable polymer composition under e.g. UV light. Photochemical initiators (also called photo-initiators) are compounds that can generate radicals by absorption of light, typically UV light. The amount of photo-initiator in such a radiation curable composition is preferably between 0.1% and 10% by weight, more preferably between 0.5 and 5% by weight, based on the total weight of the radiation curable composition. The radiation curable composition may also comprise from 0 to 5% by weight of one or more photosensitizers well known in the art. Alternatively, the composition can be cured in the absence of an initiator, especially by electron beam. Examples of suitable photoinitiators may be $\alpha$-hydroxyketones, $\alpha$-aminoketones, benzyldimethyl-ketals, acyl phosphines, benzophenone derivatives, thioxanthones, and mixtures thereof, and preferably a suitable photoinitiator is selected from the group consisting of $\alpha$-hydroxyketones, benzophenone, acyl phosphines, and mixtures thereof. Mixtures of different types of reactivity moderator can be used.

The crosslinkable composition may also be a pigmented composition. In that case pigments and/or fillers are present in the composition. A pigment normally is a solid component with low solubility in the paint medium, added to the composition to provide color. A filler is normally also a solid component with low solubility in the paint medium, added to the composition to improve other paint parameters such as increasing the volume of the paint or providing anti-corrosion properties. The amount and type of filler or pigments may influence Jmax or HSV of the pigmented composition, so the skilled person should choose the components of the composition in combination such that the pigmented composition to be used in the OFA process meets the HSV and Jmax criteria specified according to the invention.

The non-volatile matter content of the composition according to the invention at application viscosity is preferably high in view of cost and low VOC emissions but low enough in view of achieving good film forming properties and therefore is at least 35 wt % based on the total composition, preferably at least 40 wt %, more preferably higher than 45 wt % and most preferably higher than 50 wt % or even higher than 55 wt % and typically below 70, 65 or 60 wt % and the solids content is preferably chosen such that the HSV is in a range between 40 and 100 mPa·s, preferably between 50 and 90 mPa·s.

The invention also relates to a process for the preparation of the non-aqueous thixotropic resin composition comprising a) providing a resin, polyurea particles and optionally one or more further components including but not limited to crosslinking agent, organic volatile solvent, pigment, colorant, reactive diluent, curing catalyst, reactivity moderators, stabilisers and coating additives, b) mixing the components in amounts to a set high-shear viscosity HSV measured at 23° C. at a shear rate of 1000±50 $s^{-1}$ that is lower than 100 mPa·s, preferably lower than 90 mPa·s, preferably lower than 80 mPa·s and even more preferably lower than 70 mPa·s and a set creep compliance Jmax measured at 23° C. after 300 seconds using a creep stress of 1.0 Pa of lower than 250 $Pa^{-1}$, preferably lower than 150 $Pa^{-1}$, even more preferably lower than 50 $Pa^{-1}$ and most preferably lower than 25 $Pa^{-1}$. As described above HSV can be set to the required level for example by increasing the amount of organic solvent or decreasing the amount and/or the molecular weight of the resin and Jmax can be set to the desired level preferably by choosing sufficiently high amount of polyurea particles, preferably of high efficiency polyurea particles.

In one embodiment of the process at least one film forming resin a1) and polyurea particles a2) are combined in a composition (also referred to as formulation) with at least one other crosslinkable oligomer or polymer and/or at least one crosslinker. The thixotropic resin composition can suitably be prepared by a process comprising combining the film forming resin a1), polyurea particles a2), crosslinker b) and the catalyst c) This embodiment is called a one-component composition. Alternatively, thixotropic resin composition can be prepared by a process comprising combining the film forming resin a1), polyurea particles a2) and the catalyst c) to form a binder component and mixing, shortly before use, said binder component with the crosslinker b). This embodiment is called a two-component composition.

As is usual, in cases where the crosslinker b) is an isocyanate-functional crosslinker, with crosslinkable compositions comprising a hydroxy-functional binder and an isocyanate-functional crosslinker, the composition according to the invention has a limited pot life. Therefore, the composition can be suitably provided as a multi-component composition, wherein reactive components are kept in separate parts; for example as a two-component composition or as a three-component composition, wherein the polyol a1) on the one hand and the crosslinker b) on the other hand are parts of at least two different components. Therefore, the invention also relates to a kit of parts for preparing a crosslinkable composition, comprising a thixotropic binder part comprising at least one film forming resin a1), at least one polyurea particles a2) and optionally at least one catalyst c) a crosslinker part comprising at least one crosslinker b). Alternatively, the kit of parts may comprise three components, comprising i) a thixotropic binder part comprising the film forming resin a1) and polyurea particles a2), ii) a crosslinker part comprising the crosslinker b), and iii) a diluent part comprising a volatile organic diluent, wherein the catalyst c), can be distributed over parts i), ii) or iii), and wherein at least one of the parts optionally comprises the catalyst c).

In cases where the crosslinker b) does not readily react at storage temperature with film forming resin a1), for example when crosslinker b) comprises melamine-formaldehyde resins and/or blocked isocyanate groups, all components a)-c) could be supplied in one part.

The other components of the crosslinkable composition may be distributed in different ways over the parts as described above, as long as the parts exhibit the required storage stability. Components of the crosslinkable composition which react with each other upon storage, are preferably not combined in one part. If desired, the components of the coating composition may be distributed over even more parts, for example 4 or 5 parts.

The thixotropic resin composition of the invention can be applied to any substrate. The substrate may be, for example, metal, e.g., iron, steel, tinplate and aluminium, plastic, wood, glass, synthetic material, paper, leather, concrete or another coating layer. The other coating layer can be comprised of the composition of the invention or it can be a different composition. The compositions of the invention show particular utility as clear coats, base coats, pigmented top coats, primers, and fillers.

The invention also relates to the use of the non-aqueous thixotropic resin composition according to the invention as coating- adhesive- or sealant composition, preferably a clear coat composition, in overspray-free application on non-horizontal surfaces. A clear coat is essentially free of pigments and is transparent for visible light. However, the clear coat composition may comprise matting agents, for example silica based matting agents, to control the gloss level of the coating.

When the crosslinkable composition of the invention is a clear coat, it is preferably applied over a color- and/or effect-imparting base coat. In that case, the clear coat forms the top layer of a multi-layer lacquer coating such as typically applied on the exterior of automobiles. The base coat may be a water borne base coat or a solvent borne base coat. The thixotropic resin composition of the invention is also suitable as pigmented or colored topcoat for coating objects. The type of substrate that can be painted is in principle not limited and applicability depends largely on economic factors and the design of the applicator robot. Typical examples of substrates are automobiles, machinery, doors, furniture, bridges, pipelines, industrial plants or buildings, oil and gas installations, ships or parts thereof. The compositions are particularly suitable for finishing and refinishing automobiles and large transportation vehicles, such as trains, trucks, buses, airplanes and automobiles. The thixotropic resin composition of the invention is applied by jet stream-on-demand or droplet-on-demand techniques or any other method to transfer a composition to a substrate which is overspray-free, but preferably by jet stream-on-demand.

The invention also relates to a process for coating of an article comprising applying a coating layer of a non-aqueous thixotropic resin composition according to the invention using the overspray-free application process according to the above described invention on at least part of a non-horizontal surface of the article and curing the layer to form a cured coating. The invention also relates to coated articles obtainable by this process. In particular, the method provides a coating over at least a part of the surface of a transportation vehicle, wherein the method comprises the steps of applying a coating composition according to the invention to at least a part of the exterior surface of a transportation vehicle, and curing the applied coating composition, preferably in a temperature range of 5 to 180° C. Those skilled in the art will know that the curing temperature will depend on the type of crosslinker b), and can for example be carried out between 80 and 180° C. or more preferably between 100 and 160° C. in high-bake applications or between 10 and 100° C. or more preferably between 15 and 80° C. in low-bake applications.

The thixotropic resin composition of the invention may be at least partially curable upon exposure to actinic radiation. Radiation curable compositions are cured by irradiation, typically by ultraviolet (UV) radiation, generally in the presence of a photo-initiator. They can also be cured by electron-beam irradiation, allowing the use of compositions free of photo-initiator. Radiation curing is accomplished preferably by exposure to high-energy radiation, i.e. UV radiation or daylight, e.g. light with a wavelength of 172 to 750 nm, or by bombardment with high-energy electrons (electron beams, 70 to 300 keV). Various types of actinic radiation can be used such as ultraviolet (UV) radiation, gamma radiation, and electron beam. A preferred means of radiation curing is ultraviolet radiation. According to one embodiment, the UV radiations are UV-A, UV-B, UV-C and/or UV-V radiations.

The thixotropic resin composition of the invention was found to be particularly suitable for use in crosslinkable clear coat compositions used in methods and processes where the number of high bake curing steps is reduced compared to a standard process. These methods and processes with reduced number of high bake curing steps are more economic with regard to paint and energy consumption compared to standard ways of application, in which usually a primer layer is spray-applied on an electrodeposition coating, followed by a first high bake curing step, and subsequent spray-application of an aqueous basecoat layer, flash-off, spray-application of a clear coat layer and second high bake curing. High bake curing is often performed at 140 or even 160° C. In contrast, an OFA process with reduced number of high bake curing steps is often characterized in elimination of the primer layer as well as the first high bake curing step. Instead, in a process with reduced number of high bake curing steps a first aqueous colored layer is applied optionally on an electrodeposition layer followed by flash-off, application of an aqueous basecoat layer, another flash-off and application of a clear coat layer followed by one high bake curing step for all layers simultaneously wherein at least one of the layers is applied by OFA. Here, the flash-off is usually short, typically less than 1 hour, and performed at lower temperature, often up to just up to 80° C.

It was found that the thixotropic resin composition according to the invention, in particular a resin composition comprising film forming resin a1), polyurea particles a2), crosslinker c) and optionally catalyst d), more particularly clear coat compositions, is particularly suitable for a process with reduced number of high bake curing steps, giving good appearance, excellent sag resistance and very good chemical resistance.

The invention therefore also relates to a method of providing a coating, preferably a coating for at least a part of the exterior surface of a transportation vehicle, wherein the method comprises the steps of applying a first aqueous or solvent borne colored layer on a metal optionally comprising an electrodeposition layer followed by flash-off, then application of an aqueous or solvent borne basecoat layer optionally using the OFA, another flash-off and there after the application of a clear coat layer using OFA comprising the thixotropic resin composition according to the invention as described here above, followed by one high bake curing step for all layers simultaneously. The flash-off is usually short, preferably at most 1 hour, and performed at lower temperature, often up to just 90° C., preferably 80° C. High bake curing is often performed at a temperature of at least 80° C., preferably at least 120° C., most preferably at least 140° C. The high bake curing is preferably at most 180° C. In this method with reduced number of high bake curing steps according to the invention, it is preferred to use at least two different film forming binders a1), preferably comprising —OH reactive groups, in particular a polyol a1) based on a polyester polyol a1) and a (meth)acrylic polyol a1) as described here above. Alternatively one type of film forming resin a1) can be used of the type of polyester polyacrylate hybrid.

The invention further relates to the coatings and coated substrates obtained by using the compositions according to the invention or by the methods according to the invention as described here above. The composition of the invention offers possibility of overspray-free applicability thereby significantly reducing waste of paint and e.g. masking materials resulting in coatings that combine very good appearance combined with other properties such as hardness, chemical resistance, flexibility and durability and makes them particularly suitable for automotive applications, for example decorative coatings.

EXAMPLES

Abbreviations used: BA is Benzylamine, HMDI is Hexamethylene diisocyanate and o-Xylene is ortho-Xylene, NVM is non-volatile material (determined according to ISO 3251), SCA is Sag Control Agent, SAMBA is (S)-(−)-alpha-Methylbenzylamine, HSV is the high-shear viscosity determined at 23° C. at a shear rate of 1000±50 $s^{-1}$, wt % is weight percent.

Products used:

SETAL 91715 SS-55 from Allnex is a saturated polyester resin, modified with a polyurea sag control agent (SCA) in xylene/solvent naphtha (60/40) solvent (52 wt % NVM), SETAL 41715 SS-55 from Allnex is comparable to SETAL 91715 SS-55 except that the polyurea sag control agent (SCA) has a higher thixotropic efficiency, SETAL 1715 VX-74 from Allnex is a solvent borne saturated polyester resin with 4.4% OH (calculated on non-volatiles) in solvent comprising Solvent naphtha/xylene (75/25) having NVM of 71-73 wt %, SETAMINE US-138 BB-70 from Allnex is a crosslinker resin comprising n-butylated high imino melamine crosslinker supplied in n-butanol having NVM of 69-73 wt %.

All formulated paint compositions were thoroughly homogenized and filtered over a 10 or 20 micrometer filter prior to testing.

The rheological properties of the prepared paints were determined at 23° C. using a rotational, air bearing rheometer with a cone and plate geometry (AR2000, TA Instruments) using an anodized aluminum cone with 40 mm diameter and 4° cone angle. A solvent trap was used to prevent unwanted solvent evaporation. The HSV was determined from a recorded down-up flow curve (viscosity vs shear stress) at a shear rate of 1000±50 $s^{-1}$. The creep compliance Jmax was measured at 23° C. after 300 s at a creep stress of 1.0 Pa. The creep test was preceded by a high-shear treatment (30 s at 1000 $s^{-1}$) and a short stop step (2 s at 0 $s^{-1}$).

The Hegman fineness was determined using a commercial grind Hegman gauge (Byk 1511, two parallel gauges with a maximum depth of 50 micrometer).

The overspray-free application properties of the formulated paints were determined using a stationary EcoPaintJet device (ex Dürr, nozzle plate with 48 nozzles). The pressure drop over the EcoPaintJet unit was continuously measured using a pressure meter (RS pro, type 828-5745. Maximum pressure is 16 bar). A magnetically-coupled gear pump (ex Tuthill, max flow rate of 24 kg/hr, maximum pressure drop of 17.2 bar) was used to pump the paint through the EcoPaintJet. A Coriolis flow meter (ex Bronkhorst, mini Cori-Flow) was used to determine and control the actual flow rate. An inline filter (HNPM, type 316, 25 micrometers) was positioned at the inlet side of the pump. The development of the jet streams exiting the 48 holes of the nozzle plate of the EcoPaintJet was continuously monitored using a video camera (ex Mightex, CCE-B013-U) with zoom lens (ex Computar, MLH-10x) and dedicated software.

The average particle size was checked using laser diffraction using a Malvern Mastersizer 3000 with a He—Ne laser with a wavelength of 632.8 nm, a beam length of 2.4 mm and 42 element array detector, optimised for light scattering measurements, including 2 backscatter detectors. The average particle size is determined as the Volume Moment Mean diameter D[4,3]. Samples were prepared by diluting 1 gram of the thixotropic composition comprising the polyurea particles in 9 grams of butyl acetate. Subsequently, the sample was predisturbed using a vortex mixer for 2-3 minutes until dispersed. The measurement was started when the obscuration was between 10 and 12.5% and the sample had been deaerated and circulated in the measurement cell for at least 30 seconds. Measurement data were analysed using a polydisperse analysis model based on the Mie theory, assuming a particle refractive index of 1.5330, a continuous medium refractive index of 1.4000 and assuming that the particles are completely non-transparent.

The values for the melting points of the SCA's used were obtained from differential scanning calorimetry (DSC) experiments on the SCA masterbatch after drying of the sample at room temperature. DSC experiments were conducted using a TA Instruments Q2000 and aluminum, hermetic sealed crucibles containing 10+/−5 mg material. The sample was first cooled to −90° C., isothermally conditioned for 20 minutes. Following this, the temperature was increased at a rate of 10° C./min to a temperature of 210° C. The temperature program was run under nitrogen atmosphere (25 ml/min). The melting point of the SCA results in a small endothermic peak visible in the recorded heat flow in the first heating run. The melting point of the SCA is defined as the onset of this endothermic peak (tangent method).

Example 1

An SCA-modified solvent-borne non-aqueous clear coat (CC) composition according to the invention (CC-Ex1) was prepared by mixing 18.3 g. SETAL 1715 VX-74 comprising a polyester polyol as the crosslinkable film-forming resin component and 20.2 g. SETAMINE US-138 BB-70 comprising amine functional crosslinker resin component with 37.9 g. SETAL 91715 SS-55 which is a Polyurea thixotropic agent comprising HMDI-BA polyurea particle SCA in a polyester resin and solvent (having a total non-volatile matter NVM of 53 wt %, and the amount of HMDI-BA polyurea SCA is 3.28 cwt %). The resulting CC has a total resin solids weight of 49.7 cwt % and an HMDI-BA polyurea particle concentration on total resin solids weight of 1.24 cwt %. The average particle size determined using laser diffraction was less than 10 μm. The resin composition CC-Ex1 has a HSV of 60 mPa·s and the creep compliance Jmax was 238 $Pa^{-1}$. A CC with the same HSV but without SCA would have an Jmax value of 300/0.06=5000 $Pa^{-1}$, so the creep compliance Jmax was reduced by more than 95% by the SCA-modification.

The composition of CC-Ex1, its rheological properties (HSV and Jmax), its overspray-free application properties (pressure drop at flow rate of 300 g/min and jet stream development behavior) and sagging tendency on vertical panels at a dry film thickness of circa 40 micrometers are shown in Table 1. Layer thicknesses herein are defined as the thickness measured with a Fischer Deltascope FMP10. The pressure drop during overspray-free application of CC-Ex1 using the EcoPaintJet unit at a flow rate of 300 g/min was circa 7 bar and all 48 jet streams developed with high quality without blocking or obstruction of one or more nozzles. The sagging tendency of CC-Ex1 on vertical panels at a dry film thickness of circa 40 micrometers was low and severe sagging defects did not occur.

Example 2

An SCA-modified, solvent-borne non-aqueous CC formulation according to the invention (CC-Ex2) was prepared using the same crosslinkable film-forming resin component and crosslinker resin component as described in Example 1 in different amounts as indicated in Table 1 and using a HMDI-SAMBA polyurea masterbatch MB-1 which was prepared as described below. The solids content of MB-1 is 53 wt % and it contains 3.29 cwt % SCA. The average particle size determined using laser diffraction was less than 10 μm. The composition of this CC-Ex2 is shown in Table 1. The SCA concentration in CC-Ex2 is 0.90%. CC-Ex2 has a HSV of 53 mPa·s and the value of Jmax was 202 $Pa^{-1}$.

The pressure drop during overspray-free application of CC-Ex2 using the EcoPaintJet unit at a flow rate of 300 g/min was circa 6 bar and all 48 jet streams developed with high quality (no blocking). The sagging tendency of CC-Ex2 on vertical panels at a dry film thickness of circa 40 micrometers was low and severe sagging defects did not occur.

The MB-1 masterbatch resin used for CC-Ex2 was prepared in a batch reactor consisting of a one liter round bottomed, glass reactor, a dropping funnel and a mechanical anchor stirrer. A Pt100 thermometer is positioned in the liquid in the reactor close to the anchor stirrer. The reactor is placed in an ultrasonic bath (Bandelin Sonorex Digiplus DL 102 H; 120 W ultrasonic nominal power) filled with water and ice cubes. The ultrasonic bath remained switched-on during the complete production process. The reactor is filled with a premix of 500 g SETAL 1715 VX-74 (ex. Allnex. NVM is 72 wt %) and 14.03 g SAMBA. The dropping funnel is filled with a mixture of HMDI (9.83 g) and o-Xylene (165.32 g). The stirrer is set at about 300 rpm and the content of the reactor is allowed to cool to a temperature of circa 10° C. or lower by the ice water containing cooling bath. Subsequently, the HMDI/xylene mixture is added from the dropping funnel to the reactor in 10 minutes. Finally, the dropping funnel is rinsed with o-xylene (35 g) resulting in a final HMDI-SAMBA content of 3.29 cwt %. The reaction mixture remains being stirred for a period of 30 minutes after completion of the HMDI dosing procedure (post treatment) during which the ultrasonic bath remained switched on. After 30 minutes of post treatment the HMDI-SAMBA masterbatch resin MB-1 is removed from the reactor

Example 3

A thixotropic solvent borne clear coat (CC) formulation according to the invention was prepared based on SETAL 41715 SS-55 (ex. Allnex. NVM is 53 wt %, SCA content is 3.28 cwt %). The composition of this CC-Ex3 is shown in Table 1. The resulting CC has an SCA concentration of 0.77 cwt %. The average particle size determined using laser diffraction was less than 10 μm. CC-Ex3 has a HSV of 65 mPa·s and the creep compliance Jmax was 108 $Pa^{-1}$. The pressure drop during overspray-free application of CC-Ex3 using the EcoPaintJet unit at a flow rate of 300 g/min was circa 7 bar and all 48 jet streams developed with high quality (no blocking). The sagging tendency of CC-Ex3 on vertical panels at a dry film thickness of circa 40 micrometers was low and sagging defects did not occur.

Example 4

An SCA-modified, solvent borne clear coat (CC) formulation according to the invention was prepared based on a combination of HMDI-BA SCA namely SETAL 91715 SS-55 (ex. Allnex. NVM is 53 wt %, SCA content is 3.28 cwt %, melting point $T_{m2}$ is 175° C.) and a concentrated HMDI-SAMBA SCA-dispersion (SCAdisp-1) comprising 10 wt % SCA with a melting point $T_{m1}$ of 117° C. in o-xylene. This was prepared according to the procedure for example 2 of WO2018083328A1 using ultrasound vibrations during the polyurea formation reaction, but not in the presence of a resin. The composition and properties of CC-Ex4 are shown in Table 1. The resulting CC has a total SCA concentration of 1.60 cwt % and has a HSV of 71

Comparative Experiment Comp-1 and Comp-2

In conventional electrostatic spray applications used to apply clear coat formulations to vertical parts of cars, the typical concentration of HMDI-BA polyurea particles on solids weight range between 0.7-1.2 wt %. As comparative examples two clear coat formulations were prepared and tested based on the same HMDI-BA masterbatch resin as used for CC-Ex1 namely SETAL 91715 SS-55 (ex. Allnex. NVM is 53 wt %, SCA content is 3.28 cwt %). The composition and properties of Comp-1 and Comp-2 are given in Table 1. Both clear coat formulations have similar HSV as CC-Ex1. The concentration of SCA is 0.34 cwt % and 0.63 cwt % for Comp-1 and Comp-2, respectively. The average particle size determined using laser diffraction was less than 10 μm. Compared to CC-Ex1 to CC-Ex4 both Comp-1 and Comp-2 have much higher Jmax values. Comp-1 and Comp-2 did not result in too high pressure drops during overspray-free application and all jet streams did fully develop. However, both Comp-1 as well as Comp-2 show unacceptable high degrees of sagging making them unsuitable for non-horizontal overspray-free application or for overspray-free application on parts having sharp edges.

Comparative Experiment Comp-3

Comp-3 was prepared as a CC without SCA. The HSV of Comp-3 is higher than those in CC-Ex1-CC-Ex4. The composition and properties of Comp-3 are given in Table 1. Despite the fact that Comp-3 does not contain SCA and has Newtonian rheological behavior, the application of Comp-3 using the overspray-free device was not possible due to too high pressures at practical flow rates and too poor jet stream behavior at lower flow rates. Too poor jet stream behavior is denoted by incomplete development of all jet streams. As a result, no or insufficient paint is deposited at certain target positions.

TABLE 1

| | CC-Ex1 | CC-Ex2 | CC-Ex3 | CC-Ex4 | Comp-1 | Comp-2 | Comp-3 |
|---|---|---|---|---|---|---|---|
| SETAL 91715 SS-55 | 37.9 | — | — | 11.3 | 10.5 | 19.2 | — |
| SETAL 41715 SS-55 | — | — | 23.6 | — | — | — | — |
| MB-1 | — | 27.4 | — | — | — | — | — |
| SCAdisp-1 | — | — | — | 12.3 | — | — | — |
| SETAL 1715 VX-74 | 18.3 | 25.1 | 29.5 | 39.2 | 39.8 | 32.9 | 52.3 |
| SETAMINE US-138 BB-70 | 20.2 | 19.8 | 20.5 | 20.1 | 20.8 | 20.5 | 22.9 |
| Xylene | 23.6 | 27.6 | 26.4 | 17.1 | 28.9 | 27.3 | 24.8 |
| % SCA (% cwt) | 1.24% | 0.90% | 0.77% | 1.60% | 0.34% | 0.63% | 0.00% |
| HSV (mPa · s) | 60 | 53 | 65 | 71 | 63 | 63 | 96 |
| Jmax (1/Pa) at 1.0 Pa | 238 | 202 | 108 | 14 | 3364 | 2135 | 3136 |
| P at 300 g/min (bar) | 7 | 6 | 7 | 8 | 6 | 8 | >10 |
| All jet streams develop | Yes | Yes | Yes | Yes | Yes | Yes | No |
| Sagging tendency | Low | Low | Low | Very low | Extremely high | Very high | Extremely high |

mPa·s and the creep compliance Jmax was 14 $Pa^{-1}$ (Jmax was reduced by more than 99.5% by the SCA-modification). The average particle size determined using laser diffraction was less than 10 μm. The pressure drop during overspray-free application of CC-Ex4 using the EcoPaintJet unit at a flow rate of 300 g/min was circa 8 bar and all 48 jet streams developed with high quality (no blocking). The sagging tendency of CC-Ex4 on vertical panels at a dry film thickness of circa 40 micrometers was very low and sagging defects did not occur. The clear coat was cured at a curing temperature ($T_{cure}$) of 140° C. for 24 minutes.

The creep compliance measurements are shown in the graph of FIG. 1. The graph shows creep compliance measurements at a creep stress of 1.0 Pa for the resin compositions. The non-thixotropic composition without SCA and the thixotropic resin compositions Example-1, CE-1 and CE-2 have comparable resin solids content of circa 48 cwt % and comparable high-shear viscosity HSV of 60-63 mPa·s (measured at a shear rate of 1000+/−50 $s^{-1}$). Comparative examples CE1 and CE2 are measurements of standard spray paints comprising polyurea particles in amounts of 0.34 cwt % and 0.63 cwt %, respectively. Although addition of the polyurea particles in CE-1 and CE-2 resulted in lower Jmax compared to a similar resin composition without SCA, the Jmax is too high for these compositions and these compositions were not suitable for non-horizontal OFA application due to excessive sagging. Example-1 and Example-4 are measurements of thixotropic resin compositions comprising 1.24 cwt % and 1.60 cwt % of high efficient thixotropic agent which could be used in OFA application and yet did not show significant sagging.

Comparative Experiment Comp-4

Rheological properties were determined for Example 10 in WO2020187928. It was found that HSV was 112 mPa·s and the creep compliance Jmax was 1620 $Pa^{-1}$. This formulation was found to be unsuitable for OFA application, having too high values for HSV and Jmax, and not having good jet stream formation and having insufficient sag resistance.

What is claimed is:

1. A process for overspray-free application of a resin composition on a substrate surface comprising a. providing a resin composition, b. providing an overspray-free applicator comprising a print head comprising a plate comprising a plurality of perforated holes, and c. ejecting a plurality of droplet streams or jet streams of the resin composition from the plurality of holes on the substrate surface forming a layer of the resin composition, wherein the resin composition is a non-aqueous thixotropic resin composition comprising a resin and a thixotropy agent comprising polyurea particles, wherein the resin composition has a high-shear viscosity HSV measured at 23° C. at a shear rate of 1000±50 $s^{-1}$ that is lower than 100 mPa·s, and a creep compliance Jmax measured at 23° C. after 300 seconds using a creep stress of 1.0 Pa of lower than 250 $Pa^{-1}$.

2. The process according to claim 1, wherein the amount of the polyurea particles is between 0.4 and 2.5 cwt %, wherein cwt % is the weight % relative to the total weight of the resin composition not including the weight of optional pigments or fillers.

3. The process according to claim 1, wherein the print head and the substrate are at an application distance between 0.1 and 15 cm, and the holes have a diameter between 10 and 200 micrometers.

4. The process according to claim 1, wherein the non-aqueous thixotropic resin composition has a Hegman fineness less than the layer thickness by at least 20%.

5. A process for coating of an article, comprising applying a coating layer of a non-aqueous thixotropic resin composition, using the overspray-free application process of claim 1 on at least part of a non-horizontal surface of the article and curing the layer to form a cured coating, wherein the non-aqueous thixotropic resin composition comprises a resin and a thixotropy agent comprising polyurea particles, wherein the composition has a) a high-shear viscosity HSV measured at 23° C. at a shear rate of 1000±50 $s^{-1}$ that is lower than 100 mPa·s, b) a creep compliance Jmax measured at 23° C. after 300 seconds using a creep stress of 1.0 Pa of lower than 250 $Pa^{-1}$, and c) an amount of the polyurea particles between 0.4 and 2.5 cwt %.

* * * * *